United States Patent [19]
Nishizawa et al.

[11] Patent Number: 6,002,413
[45] Date of Patent: Dec. 14, 1999

[54] COLOR IMAGE FORMING APPARATUS HAVING CORRECTION OF COLOR IMAGE OFFSET

[75] Inventors: Katsuhiko Nishizawa; Tsuneo Toda, both of Saitama; Takayoshi Suzuki, Kanagawa, all of Japan

[73] Assignee: Fuji Xerox Co., Ltd., Japan

[21] Appl. No.: 08/996,481

[22] Filed: Dec. 22, 1997

[30] Foreign Application Priority Data

Dec. 27, 1996 [JP] Japan .................................... 8-350968

[51] Int. Cl.⁶ ............................ B41J 2/385; G03G 15/01; G01D 15/06
[52] U.S. Cl. ............................... 347/116; 399/40; 399/301
[58] Field of Search ..................................... 347/115, 116, 347/232, 233, 234, 172, 15; 399/40, 301, 395; 358/296

[56] References Cited

FOREIGN PATENT DOCUMENTS

| | | |
|---|---|---|
| 1-183676 | 7/1989 | Japan . |
| 2-96780 | 4/1990 | Japan . |
| 6-246975 | 9/1994 | Japan . |

*Primary Examiner*—N. Le
*Assistant Examiner*—L. Anderson
*Attorney, Agent, or Firm*—Finnegan, Henderson, Farabow, Garrett & Dunner, L.L.P.

[57] ABSTRACT

Light scanning devices forming electrostatic latent images on photosensitive bodies are disposed so as to correspond respectively to the plurality of photosensitive bodies which correspond to a plurality of colors, respectively. Electrooptical elements are disposed on light paths of light beams. The electrostatic latent images formed on the respective photosensitive bodies 1 are respectively developed by developing means. Developed electrostatic latent images are respectively superposed together and transferred onto a sheet, so that a color image is formed. Images-for-detecting-offset-amounts, which are formed on a conveying body by the light scanning devices, are detected, and offset amounts of images of the respective colors are detected. Based on detected offset amounts, voltages are applied to the respective electrooptical elements such that the offset amounts become values of a predetermined range.

23 Claims, 19 Drawing Sheets

ELECTRODES

ELECTROOPTICAL CRYSTAL SUCH AS LiNbO₃ OR THE LIKE

ELECTRODES

F I G. 5
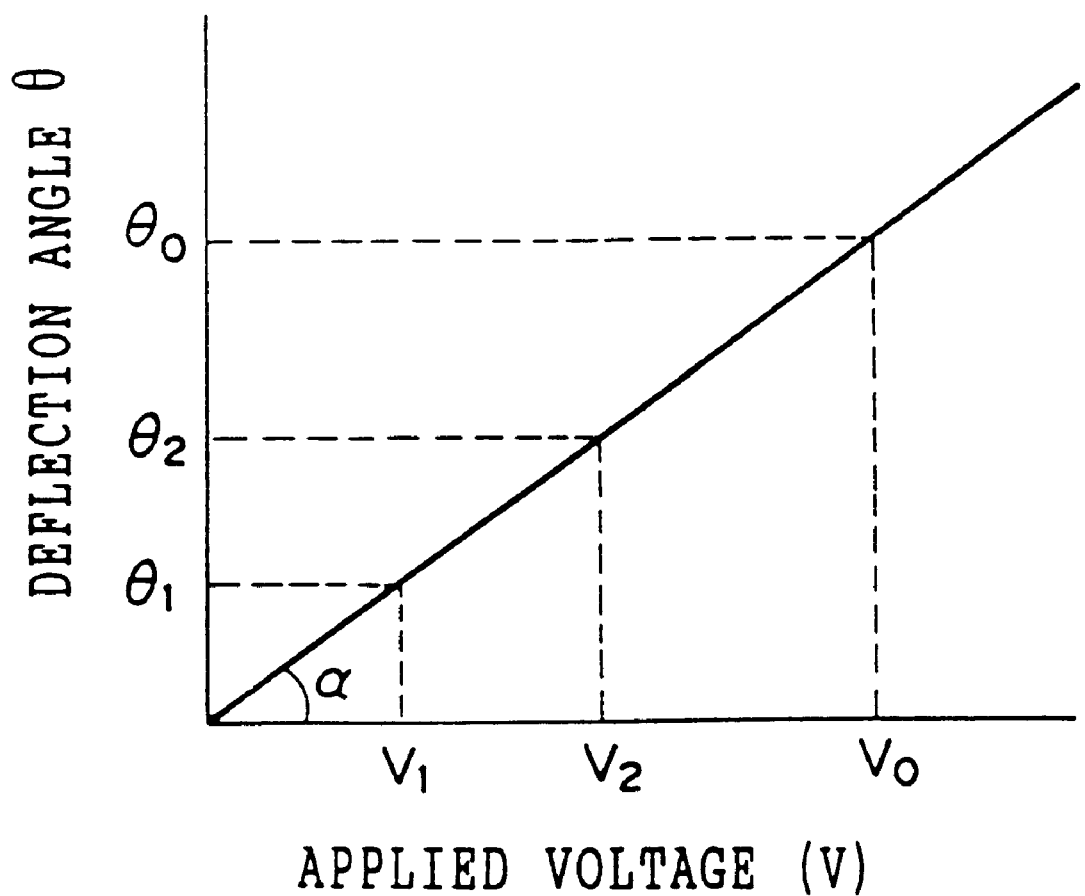

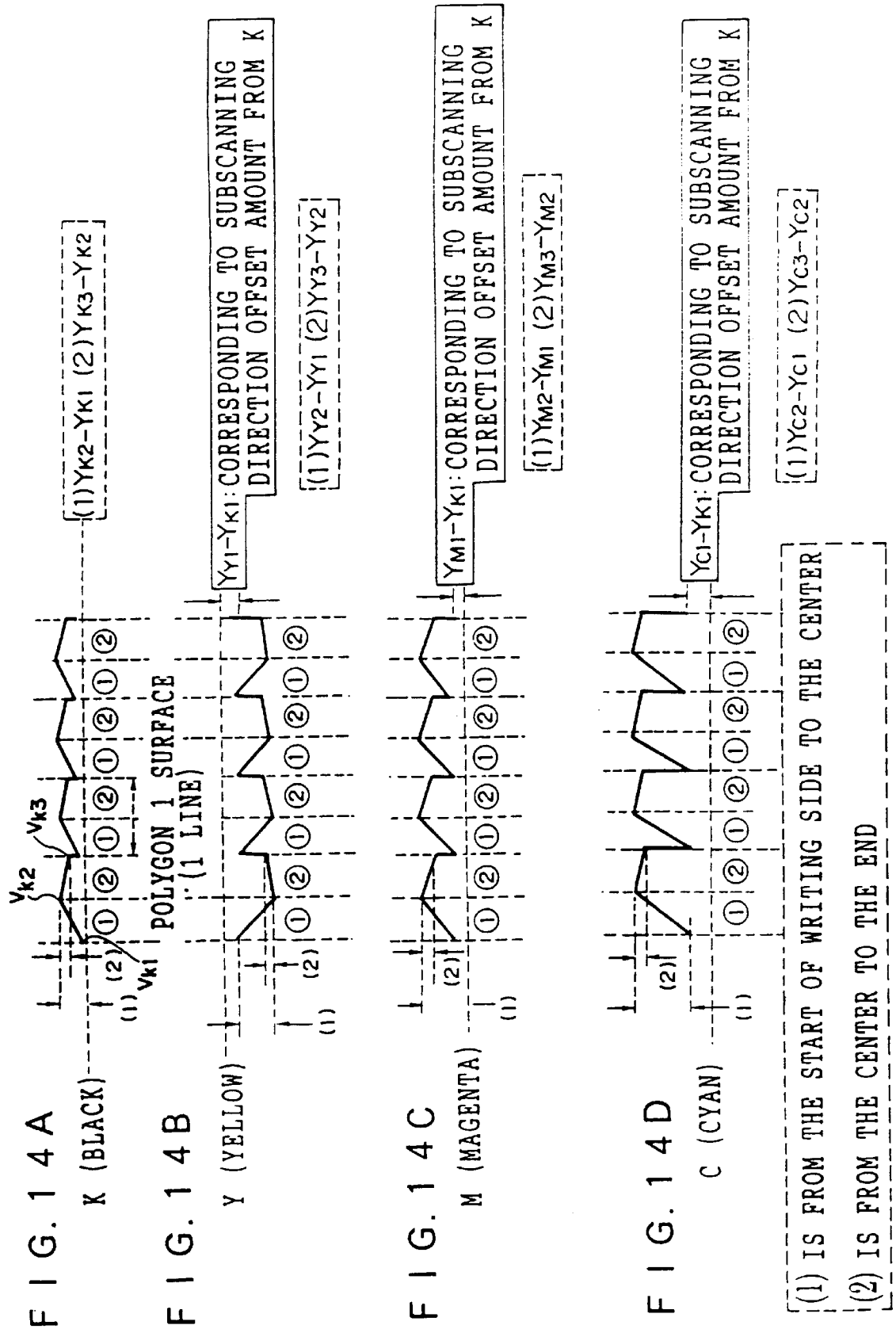

FIG. 15A
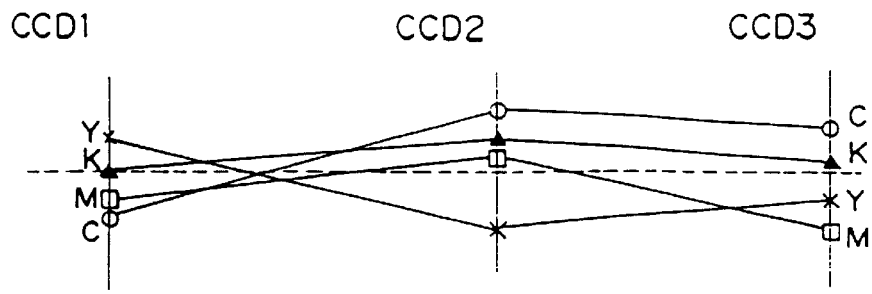
FIG. 15B
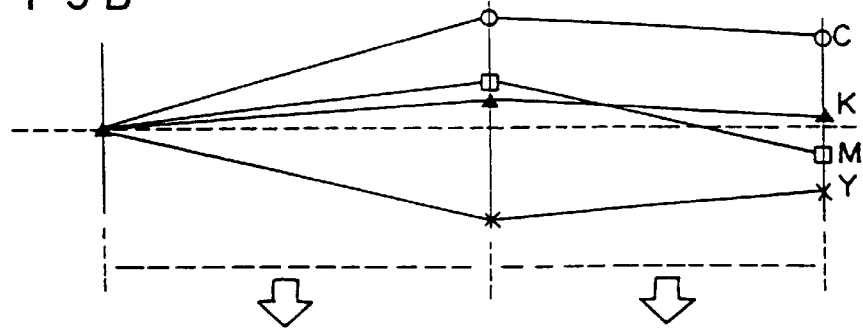
FIG. 15C

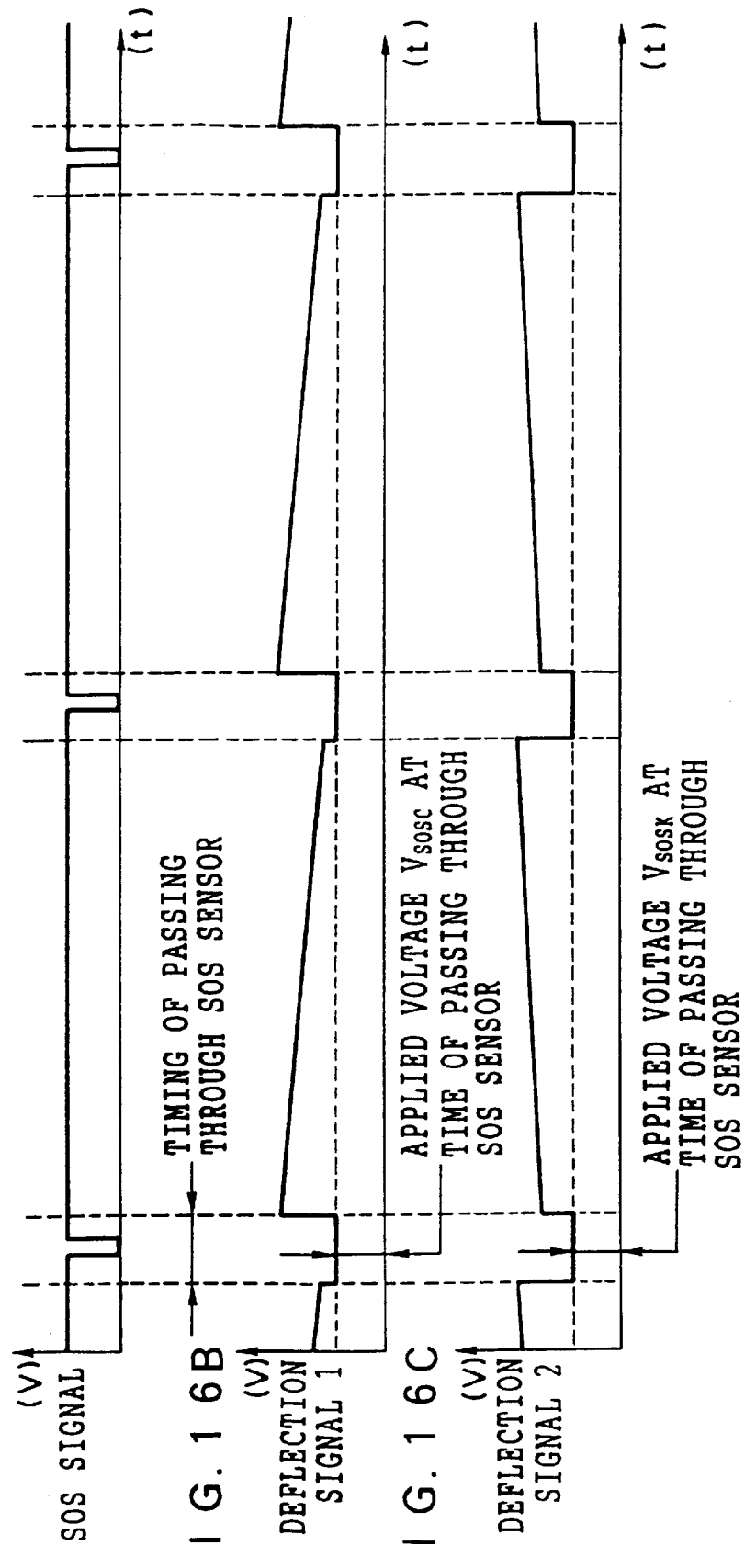
FIG. 16A SOS SIGNAL
FIG. 16B DEFLECTION SIGNAL 1
FIG. 16C DEFLECTION SIGNAL 2

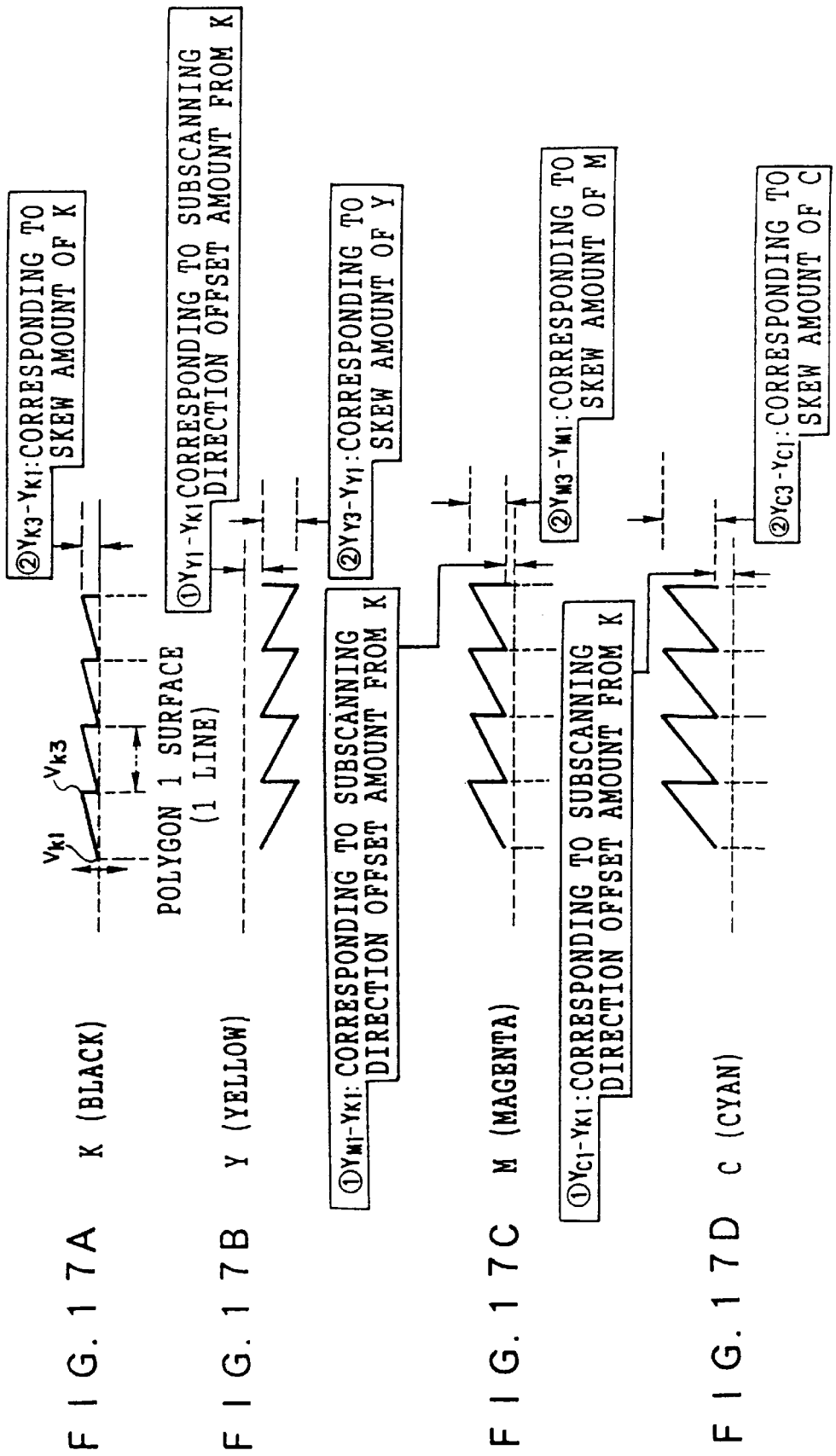

FIG. 18A
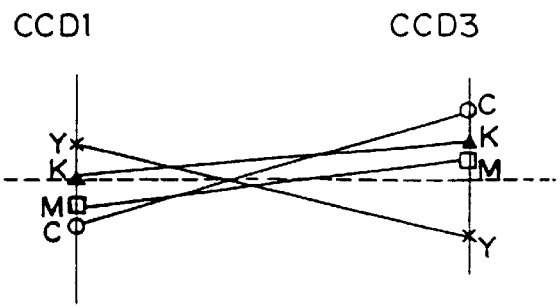
FIG. 18B
CORRECT SUBSCANNING DIRECTION OFFSET
AMOUNTS FROM REFERENCE COLOR (K)
FROM DETECTED AMOUNTS OF CCD1
$Y_{Y1} - Y_{K1}$
$Y_{M1} - Y_{K1}$
$Y_{C1} - Y_{K1}$
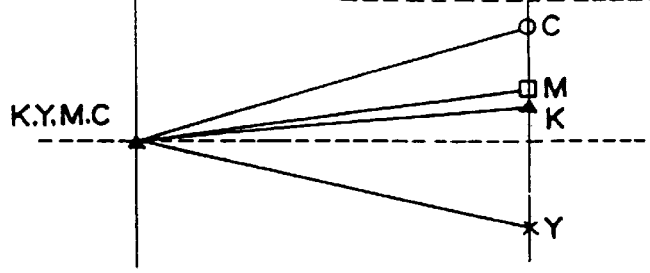
CORRECT AMOUNTS OF SKEW OF
SCAN LINES OF RESPECTIVE
LIGHT SCANNING DEVICES
$Y_{K3} - Y_{K1}$
$Y_{Y3} - Y_{Y1}$
$Y_{M3} - Y_{M1}$
$Y_{C3} - Y_{C1}$
FIG. 18C
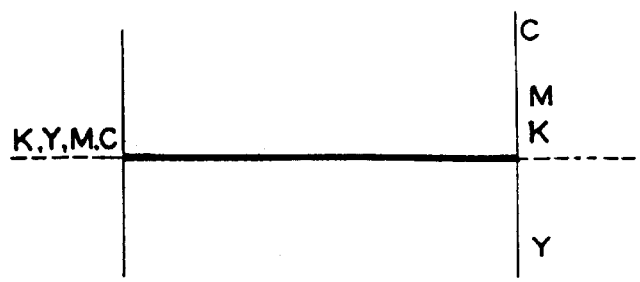

COLOR IMAGE FORMING APPARATUS HAVING CORRECTION OF COLOR IMAGE OFFSET

BACKGROUND OF THE INVENTION

1. Field of the Invention

The present invention relates to a color image forming apparatus, and in particular, to a color image forming apparatus in which electrostatic latent images are formed on photosensitive bodies by light beams being scanned by being deflected in a predetermined direction by a plurality of light scanning means disposed in correspondence with the plurality of photosensitive bodies which are provided in correspondence with colors to be developed, and the electrostatic latent images formed on the respective photosensitive bodies are developed by coloring materials of colors corresponding to the photosensitive bodies, and the developed images of the respective colors are superposed together and transferred onto a transfer medium such that a color image is formed.

2. Description of the Related Art

Conventionally, a color image forming apparatus is provided with a plurality of photosensitive bodies (e.g., four photosensitive bodies which are Y (yellow), M (magenta), C (cyan), and K (black)). Electrostatic latent images are formed on the photosensitive bodies of the respective colors by laser beams being turned on and off on the basis of image information of the respective colors by light scanning devices corresponding to the respective photosensitive bodies. By successively superposing toner images developed by developing means onto a single transfer medium, a desired color image is formed.

At this time, if the images which are superposed onto the single transfer medium are offset per color (referred to hereinafter as "color offset"), the hue changes, color unevenness occurs, and the like, such that the desired output image cannot be obtained. Reasons for color offset include offset of the light scanning positions due to the temperatures or the like of the light scanning devices, skewing or bowing of the scan lines of the respective light scanning devices, offset of the positions at which writing of the respective colors begin, offset of the light scanning positions due to uneven speeds of the photosensitive bodies or the conveying bodies, vibration or the like, changes over time, or the like. Among these, factors which most markedly affect image quality are skewing and bowing of the scan lines of the light scanning devices and offset of the positions at which writing of the respective colors begin.

Conventionally, in order to correct such offset, a patch image for detecting offset amounts of scan lines is formed on the transfer medium at the time the power source is turned on or at the time of the print cycle. By reading the patch image by a CCD, the relative amounts of offset from a reference color can be detected. Two CCDs are disposed at both ends of the image forming region on the transfer medium. By detecting offset at two points, the skewing of the scan lines of the respective light scanning devices can be detected.

In Japanese Patent Application Laid-Open No. 1-183676, subscanning direction offset from a reference color is corrected by moving, parallel and in the respective subscanning directions, bend-back mirrors of the light scanning devices other than the reference color, by using stepping motors and in accordance with the relative amounts of offset from the reference color. Further, there is a technique for correcting skewing by moving the stepping motors, which are at two places at the left and the right of the bend-back mirror holding portions, in accordance with the detected amounts read at CCDs (the amounts of offset). Further, in Japanese Patent Application Laid-Open No. 2-96780, from the detected results read by CCDs and in accordance with the amounts of skewing from the reference color, correction is carried out to make the color offset inconspicuous by tilting fθ lenses at the light scanning devices of the other colors to the left and the right by stepping motors so as to make the amounts of skewing coincide with the reference color. In addition, there are structures in which, other than stepping motors, piezoelectric elements are used in order to correct the color offset by tilting and moving the mirrors. In this way, it has conventionally been common to correct color offset by mechanical correction.

Bowing of scan lines of a light scanning device occurs due to the optical layout and the planarity of the mirror, the deflection of the mirror, and the like. Conventionally, the optical parts have been designed such that bowing of the scan lines is corrected.

Further, it is conventionally common to effect adjustment by one pixel unit in the subscanning direction by adjusting a predetermined signal count value (for starting image writing). In addition, in Japanese Patent Application Laid-Open No. 6-246975, adjustment of less than or equal to one pixel unit is carried out by controlling the rotation phases of rotating polygon bodies (hereinafter called "scanner motors") which deflect the laser beams of the light scanning devices of the respective colors.

However, in the inventions disclosed in Japanese Patent Application Laid-Open No. 1-183676 and Japanese Patent Application Laid-Open No. 2-96780 and the like, correction is carried out so as to eliminate color offset by mechanical control. In this method, the correction cycle requires an extremely great amount of time. As a result, there is the problem that it cannot be executed during a regular print cycle. In actuality, the correction cycle requires several minutes. If this correction cycle is executed during a print cycle, the user is made to wait during this time. In particular, in cases in which minute correction is carried out for each color, even more time is required.

Accordingly, the mechanical correction as described above is executed only at the time of initial setting when the power source of the image forming device is turned on. Namely, there is the problem that the amount of offset which is caused by fluctuations in the positions of the scanning beams caused by temperature or the like during the print cycle, or by variations over time, or the like cannot be corrected.

Further, as one more reason why the correction cycle cannot be executed during the print cycle, there is the following reason. Namely, in the above-described correction method, for example, when skewing of the scan lines of the light scanning devices of the respective colors is corrected, registration (reference position) in the subscanning direction is offset. In this way, there is the problem that plural parameters cannot be controlled independently.

Namely, when correction is carried out mechanically as in the conventional art, too much time is required to carry out minute correction, and if attempts are made to complete the correction cycle in a short time, only rough correction can be carried out. Namely, with mechanical control, there is a trade-off between precision and speed. When aiming for high image quality and high image speed, this is fatal, and meeting of the user's requirements cannot be achieved. Further, there is also the problem that the device becomes large-scale.

SUMMARY OF THE INVENTION

The present invention was achieved in light of the above-described facts, and an object thereof is to provide a color image forming apparatus in which electrostatic latent images formed on a plurality of photosensitive bodies are developed by coloring materials of colors corresponding to the photosensitive bodies, and the amount of offset of a color image formed by superposing together and transferring the developed images of the respective colors onto a transfer medium can be corrected in a short time and precisely.

In order to achieve the above-described object, the first aspect of the present invention is a color image forming apparatus comprising: a plurality of photosensitive bodies provided in correspondence with colors to be developed; a plurality of light scanning means, disposed in correspondence with said plurality of photosensitive bodies respectively, for scanning light beams by deflecting the light beams in a predetermined direction so as to form electrostatic latent images on said photosensitive bodies; a plurality of developing means for developing the electrostatic latent images formed on said respective photosensitive bodies, respectively, by coloring materials of colors corresponding to said respective photosensitive bodies; transfer means for superposing together and transferring the developed images of respective colors onto a transfer medium; electrooptical elements disposed on light paths of the light beams emitted by said plurality of light scanning means, and deflecting, by amounts corresponding to applied voltages, the light beams transmitted therethrough; voltage applying means for applying voltages to said electrooptical elements; offset amount detecting means for detecting images-for-detecting-offset-amounts which are formed on the transfer medium by said plurality of light scanning means, said plurality of developing means, and said transfer means, so as to detect offset amounts of the images of the respective colors; and control means for, on the basis of the detected offset amounts, controlling said voltage applying means to apply to said respective electrooptical elements voltages for making the offset amounts of the images of the respective colors values within a predetermined range.

The second aspect of the present invention is a color image forming apparatus comprising: a plurality of photosensitive bodies provided in correspondence with colors to be developed; a plurality of light scanning means, disposed in correspondence with said plurality of photosensitive bodies respectively, for scanning light beams by deflecting the light beams in a predetermined direction so as to form electrostatic latent images on said photosensitive bodies; a plurality of developing means for developing the electrostatic latent images formed on said respective photosensitive bodies, respectively, by coloring materials of colors corresponding to said respective photosensitive bodies; transfer means for superposing together and transferring the developed images of respective colors onto a transfer medium; electrooptical elements disposed on light paths of the light beams emitted by said plurality of light scanning means, and deflecting, by amounts corresponding to applied voltages, the light beams transmitted therethrough; voltage applying means for applying voltages to said electrooptical elements; offset amount detecting means for detecting images-for-detecting-offset-amounts which are formed on the transfer medium by said plurality of light scanning means, said plurality of developing means, and said transfer means, so as to detect offset amounts of the images of the respective colors; judging means for judging whether the detected offset amounts are greater than or equal to a predetermined value; and control means for, in a case in which the detected offset amounts are judged by said judging means to be less than the predetermined value, controlling, on the basis of the detected offset amounts, said voltage applying means such that voltages for the offset amounts of the images of the respective colors to become values within a predetermined range are applied to said respective electrooptical elements, and in a case in which the detected offset amounts are judged by said judging means to be greater than or equal to the predetermined value, controlling, on the basis of the detected offset amounts, said voltage means and controlling timing of emission of the light beams of said plurality of light scanning means, such that the offset amounts of the images of the respective colors become values within a predetermined range.

The third aspect has the feature that said offset amount detecting means detects a plurality of images-for-detecting-offset-amounts which are formed by said plurality of light scanning means, said plurality of developing means, and said transfer means, at plural positions aligned along a direction corresponding to the predetermined direction on the transfer medium, and on the basis of the detected plurality of images-for-detecting-offset-amounts, said offset amount detecting means detects skews or amounts of bowing of respective scan lines of the predetermined direction of said respective photosensitive bodies, and detects offset amounts of the images of the respective colors.

The fourth aspect has the feature that said offset amount detecting means detects positions of the images of the respective colors of the plurality of images-for-detecting-offset-amounts, and detects skews or amounts of bowing of respective lines on the transfer medium.

The fifth aspect has the feature that said offset amount detecting means detects the offset amounts by using as a reference a predetermined position on the transfer medium or any one image of the images of the respective colors.

The sixth aspect further comprises condition establishment judging means for judging whether a predetermined condition for said control is established, wherein in a case in which it is judged by said condition establishment judging means that a condition is established, said control means effects said control.

The seventh aspect further comprises position detecting means for detecting positions of scan lines of said respective photosensitive bodies, wherein said control means computes displacement amounts of the detected positions each time the light beams are deflected, and on the basis of the computed displacement amounts, said control means again controls said voltage applying means to apply to said respective electrooptical elements voltages for the displacement amounts to become values of a predetermined range.

The eighth aspect has the feature that said position detecting means detects light beams passing through at least one of predetermined first positions before positions of initial incidence onto image forming regions of said respective photosensitive bodies and predetermined second positions after positions of final incidence, and on the basis of the detection of the light beams by said position detecting means, said plurality of light scanning means adjusts the timing of emission of the light beams, and said control means controls said voltage applying means such that voltages, of predetermined magnitudes and for the light beams passing through said electrooptical elements to pass through at least one of said first positions and said second positions, are applied to said respective electrooptical elements at a timing at which said light beams pass through at least one of said first positions and said second positions.

The ninth aspect has the feature of further comprising light beam detecting means for detecting light beams passing through at least one of predetermined first positions before positions of initial incidence onto image forming regions of said respective photosensitive bodies and predetermined second positions after positions of final incidence, and on the basis of the detection of said light beams by said light beam detecting means, said plurality of light scanning means adjusts the timing of emission of said light beams, and said control means controls said voltage applying means such that voltages, of predetermined magnitudes and for the light beams passing through said electrooptical elements to pass through at least one of said first positions and said second positions, are applied to said respective electrooptical elements at a timing at which said light beams pass through at least one of said first positions and said second positions.

Namely, the first aspect is provided with a plurality of photosensitive bodies corresponding to colors to be developed. For example, four photosensitive bodies corresponding to four colors of Y (yellow), M (magenta), C (cyan) and K (black) are provided.

A plurality of light scanning means are disposed in correspondence with the plurality of photosensitive bodies. The plurality of light scanning means scan light beams by deflecting the light beams in a predetermined direction, so as to form electrostatic latent images on the respective photosensitive bodies.

The plurality of developing means develop the respective electrostatic latent images formed on the respective photosensitive bodies, by coloring materials of colors corresponding to the respective photosensitive bodies. The transfer means superposes together and transfers the respective developed images of the respective colors onto a transfer medium. In this way, a color image is formed.

In the present invention, electrooptical elements are disposed on the light paths of the respective light beams emitted by the plurality of light scanning means. The electrooptical elements deflect, by amounts corresponding to the applied voltages, the light beams transmitted therethrough.

Further, in the present invention, images-for-detecting-offset-amounts are formed on the transfer medium by the plurality of light scanning means, the plurality of developing means, and the transfer means. The images-for-detecting-offset-amounts are detected by the offset amount detecting means, and the offset amounts of the images of the respective colors are detected.

On the basis of the offset amounts detected by the offset amount detecting means, the control means controls the voltage applying means to apply voltages to the electrooptical elements such that voltages for the offset amounts of the images of the respective colors to become values within a predetermined range are applied to the respective electrooptical elements. Further, the values within a predetermined range may preferably be values (substantially 0) such that the offset amounts are completely eliminated, but values less than or equal to an offset amount of an extent that it cannot be discerned that the images of the respective colors are offset are also fine.

In this way, in the present invention, the images-for-detecting-offset-amounts, which are formed on the transfer medium by the plurality of light scanning means, the plurality of developing means, and the transfer means, are detected, and the offset amounts of the images of the respective colors are detected. On the basis of the detected offset amounts, voltages, for the offset amounts of the images of the respective colors to become values within a predetermined range, are applied to the respective electrooptical elements, so that the offset amounts are corrected. As a result, because correction is not effected mechanically by stepping motors or the like, the offset amounts can be corrected precisely in a short period of time. Namely, the offset amounts can be corrected to a minute level of less than or equal to one pixel.

Further, because voltage is applied to the respective electrooptical elements and the offset amounts are corrected, there is no need for mechanical structural elements by stepping motors or the like, and the color image forming apparatus can be made compact.

Further, even in cases in which the offset amounts of the images of the respective colors are greater than or equal to a predetermined value, e.g., greater than or equal to one pixel, voltage for the offset amounts to become values within a predetermined range may be applied to the respective electrooptical elements. Further, the timing of the emission of the light beams of each of the plurality of light scanning means can be controlled. Namely, as in the second aspect, the judging means judges whether the offset amounts detected by the offset amount detecting means are greater than or equal to a predetermined value. In a case in which it is judged by the judging means that the offset amounts are less than the predetermined value, the control means controls the voltage means on the basis of the detected offset amounts such that voltages, for the offset amounts of the images of the respective colors to become values within a predetermined range, are applied to the respective electrooptical elements. Further, in a case in which it is judged by the judging means that the offset amounts are greater than or equal to the predetermined value, on the basis of the detected offset amounts, the control means controls the voltage applying means and controls the timing of the emission of the light beams of the plurality of light scanning means such that the offset amounts of the images of the respective colors become values within a predetermined range.

In this way, the voltage applying means is controlled and the timing of the emission of the light beams of the plurality of light scanning means is controlled. Therefore, the magnitudes of the voltages applied to the electrooptical elements can be made small. Accordingly, the life of the electrooptical elements can be lengthened, and the deflection angles can be made small. Therefore, the color image forming apparatus can be simplified, and can be structured at a low cost.

Further, in a case in which it is judged by the judging means that the offset amounts are greater than or equal to the predetermined value, the timing of the emission of the light beams of the plurality of light scanning means may be controlled, the offset amounts of the images of the respective colors may be corrected, per one pixel unit, to become less than one pixel, and the voltage means may be controlled such that the offset amounts of less than one pixel remaining due to this correction may be corrected. Further, the control of the timing of the emission of the light beams of the plurality of light scanning means and the method of control of the voltage applying means are not limited to this method.

Moreover, an offset amount detecting means may detect the plurality of images-for-detecting-offset-amounts which are formed at positions aligned in a direction corresponding to the predetermined direction on the transfer medium by the plurality of light scanning means, the plurality of developing means and the transfer means, and on the basis of the detected plurality of images-for-detecting-offset-amounts, the offset amount detecting means may detect the skews or the bowing amounts of the respective scan lines of the predetermined direction of the respective photosensitive bodies, and may detect the offset amounts of the images of the respective colors. Further, in this case, the positions of the images of the respective colors of the plurality of images-for-detecting-offset-amounts are detected, and the skews or the amounts of bowing of the respective scan lines on the transfer medium are detected. Moreover, the offset amount detecting means detects the offset amounts by using as a reference a predetermined position on the transfer medium or any one image of the images of the respective colors.

In this way, the plurality of images-for-detecting-offset-amounts, which are formed at a plurality of positions aligned in a direction corresponding to the predetermined direction on the transfer medium, are detected. On the basis of the detected plurality of images-for-detecting-offset-amounts, the skews or the bowing amounts of the respective scan lines of the predetermined direction of the respective photosensitive bodies are detected. The offset amounts of the images of the respective colors are corrected. Accordingly, the offset amounts can be corrected while an ordinary color image is being formed.

Further, the above-described control by the control means may be executed in a case in which it is judged by the condition establishment judging means that a predetermined condition for the above-described control has been established. Further, examples of the condition are that the power source of the color image forming apparatus has been turned on, the temperature of a predetermined region within the color image forming apparatus has changed, the offset amounts of the respective colors have become greater than or equal to a predetermined value, the amounts of change in positions of the scan lines of the respective photosensitive bodies have become greater than or equal to a predetermined value, or the like.

A position detecting means for detecting the positions of the scan lines of the respective photosensitive bodies may be further provided. The control means may compute the amounts of displacement of the positions detected each time the light beams are deflected, and on the basis of the computed amounts of displacement, the control means may further control the voltage applying means to apply to the respective electrooptical elements voltages which are such that the amounts of displacement become values within a predetermined range.

Further, the position detecting means detects the light beams which pass through predetermined positions before positions of initial incidence onto the image forming regions of the respective photosensitive bodies.

On the other hand, in a case in which the offset amounts are corrected by control or the like of the voltages applied to the electrooptical elements as described above, there is the concern that the amounts of correction may be too large and the light beams may not pass through the predetermined positions.

Here, the control means may control the voltage applying means to apply to the respective electrooptical elements voltages, which are of magnitudes detected in advance and which are for the light beams which have passed through the electrooptical elements to pass through the predetermined positions, at the timing at which the light beams pass through the predetermined positions. In this way, in a case in which the offset amounts are corrected by control or the like of the voltages applied to the electrooptical elements as described above, the light beams can be prevented from not passing through at least one of the first positions and the second positions due to the amounts of correction being too large.

BRIEF DESCRIPTION OF THE DRAWINGS

FIG. 5 is a graph illustrating a relationship between voltage applied to the electrooptical element and a deflection angle of a transmitted laser beam.

FIG. 14A through FIG. 14D are diagrams illustrating waveforms of voltages applied to electrooptical elements when bowing of lines on a transfer medium corresponding to scan lines of respective photosensitive bodies is corrected.

FIG. 15A through FIG. 15C are diagrams illustrating a flow of correction of bowing of lines on a transfer medium corresponding to scan lines of respective photosensitive bodies.

FIG. 16A through FIG. 16C are diagrams illustrating voltages applied to electrooptical elements at the timing when respective laser beams illuminate the horizontal synchronization sensors.

FIG. 17A through FIG. 17D are diagrams illustrating waveforms of voltages applied to electrooptical elements when skews of lines on a transfer medium corresponding to scan lines of respective photosensitive bodies are corrected.

FIG. 18A through FIG. 18C are diagrams illustrating the flow of correction of skews of lines on a transfer medium corresponding to scan lines of respective photosensitive bodies.

DESCRIPTION OF THE PREFERRED EMBODIMENTS

Figure 1:
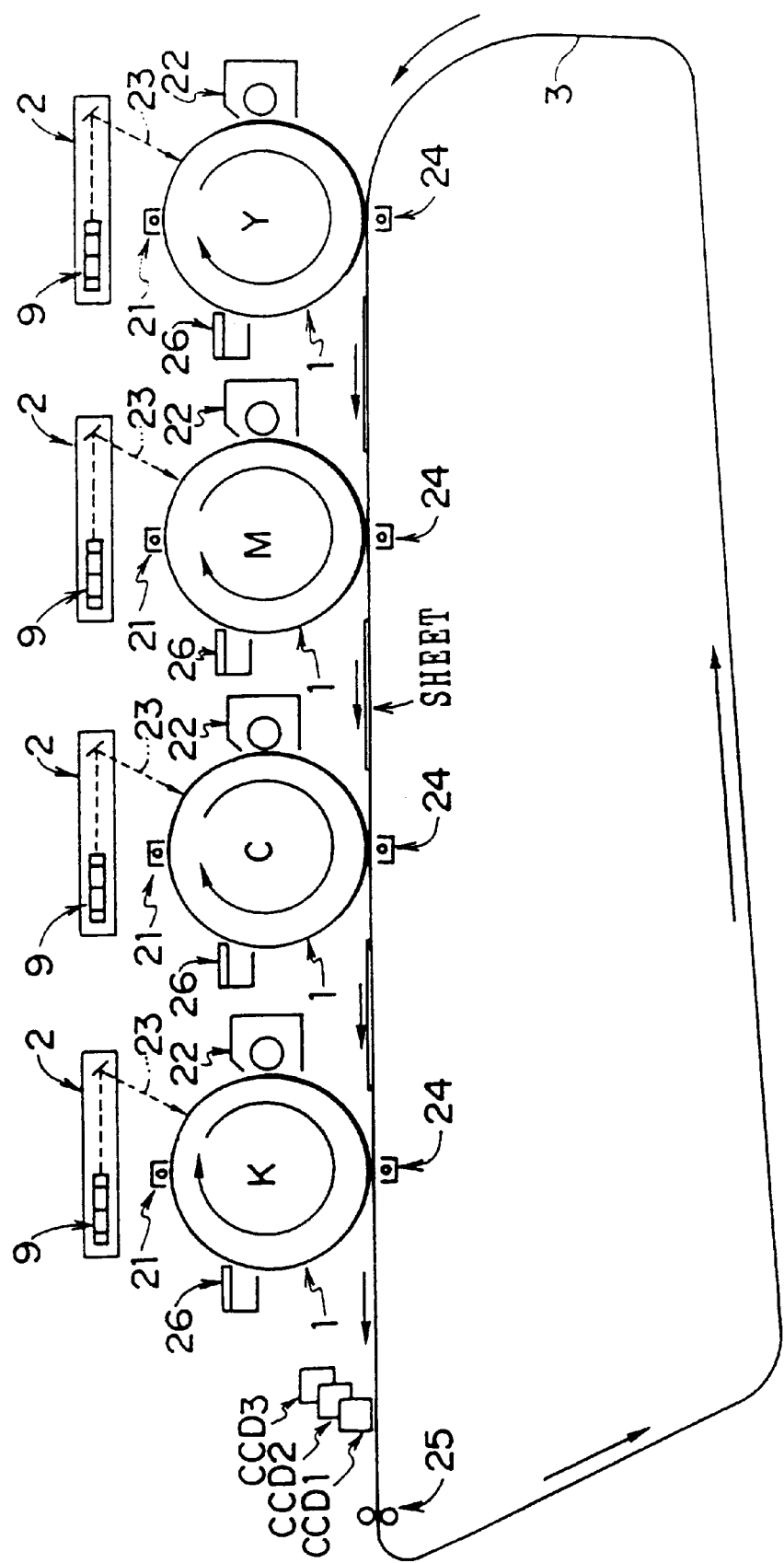
FIG. 1 is a diagram for explaining processes of a color image forming apparatus relating to the present embodiment.

Embodiments of the present invention will be described in detail hereinafter with reference to the drawings. As illustrated in FIG. 1, the color image forming apparatus of the present embodiment includes plural (four) photosensitive bodies 1 corresponding to colors of Y (yellow), M (magenta), C (cyan), and K (black). A charging means 21, a developing means 22, a fixing means 24 and a cleaning means 26 are provided in that order around each photosensitive body 1. Light scanning devices 2 serving as light scanning means are provided so as to correspond to the respective photosensitive bodies 1.

Further, the color image forming apparatus is provided with a conveying body 3 on which sheets are conveyed so as to contact the respective photosensitive bodies 1. In this way, because a sheet is conveyed by the conveying body 3 so as to contact the respective photosensitive bodies 1, the respective images which are formed on the photosensitive bodies 1 and developed are superposed and transferred onto the sheet.

Figure 2:
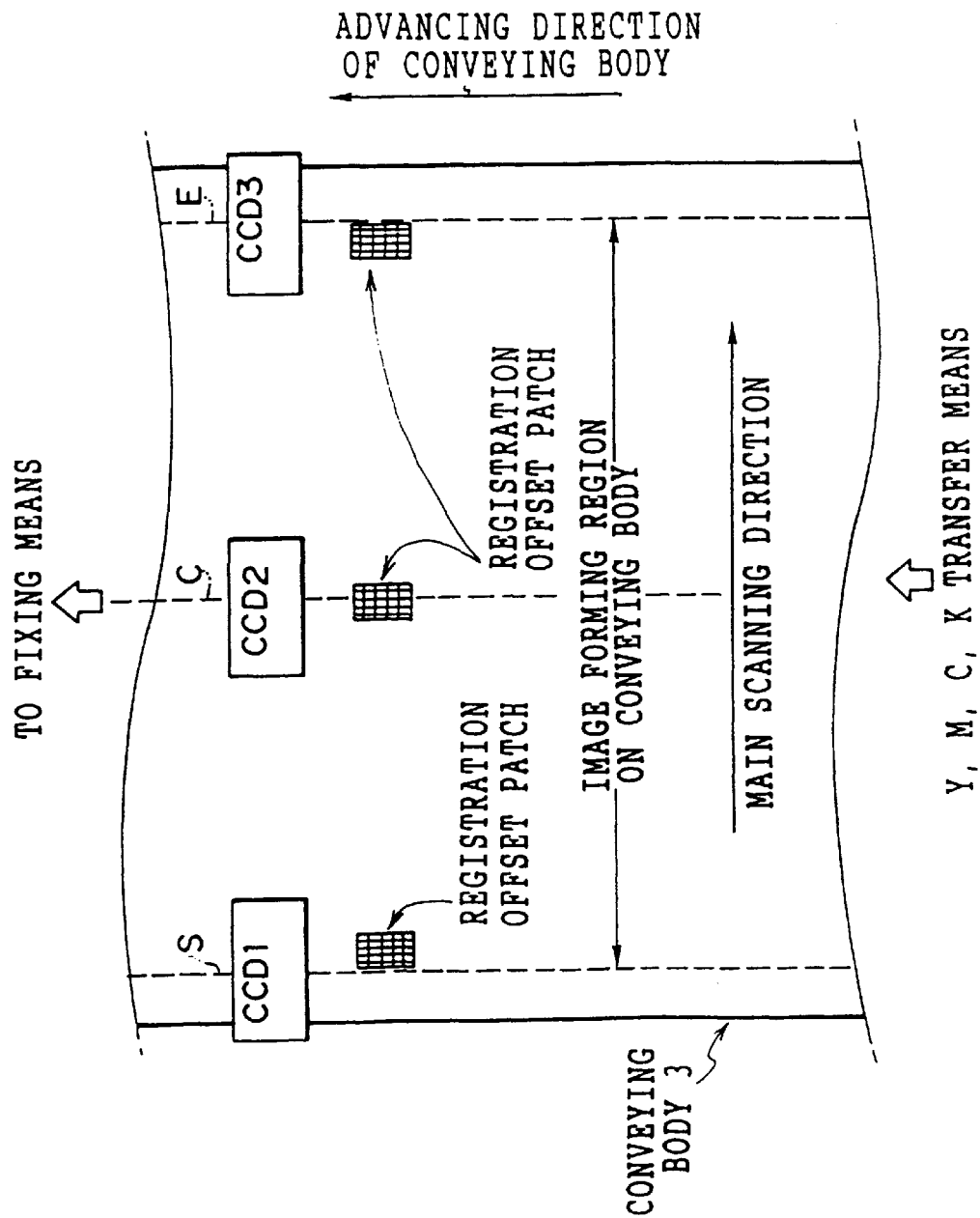
FIG. 2 is a diagram illustrating patch image reading positions of respective CCDs.

As illustrated in FIG. 2, CCD1 through CCD3, which read the image formed on the conveying body 3 as will be described later, are disposed so as to correspond to a beginning position S, a central position C, and a final end position E of the image forming region on the sheet conveyed by the conveying body 3. The CCD1 through the CCD3 correspond to the offset amount detecting means of the present invention. Further, a fixing means 25 is provided at the conveying body 3. Moreover, if the image formed on the conveying body 3 can be read, it is not limited to the CCD.

Figure 3:
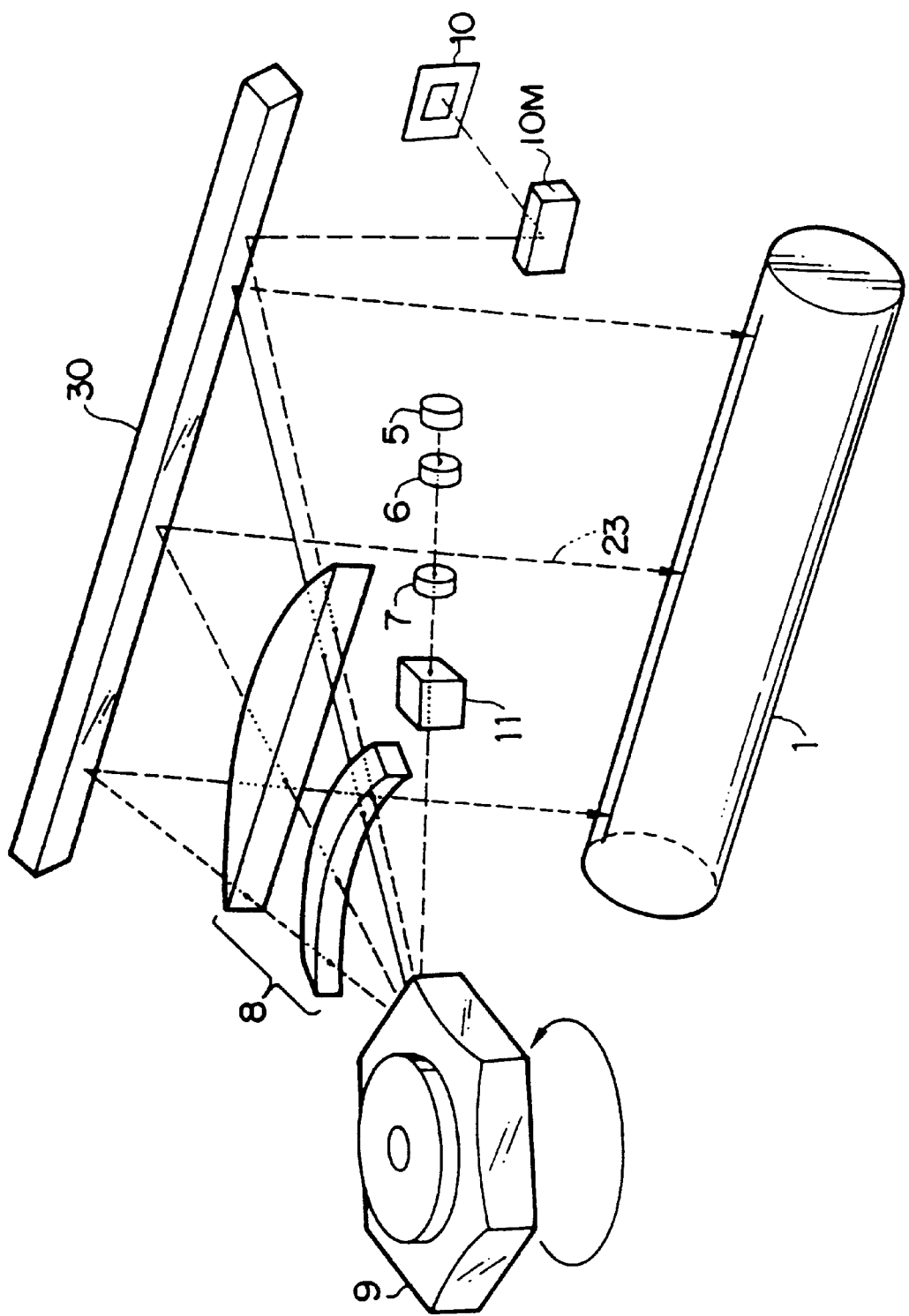
FIG. 3 is a block diagram illustrating a light scanning device of the present embodiment.

As illustrated in FIG. 3, each of the light scanning devices 2 includes a laser diode 5. A collimator lens 6, a cylinder lens 7, an electrooptical element 11, and a rotating polygon mirror (polygon mirror) 9 are disposed on the optical axis of the laser diode 5 in that order from the side near the laser diode 5. An fθ lens 8, a bend-back mirror 30, and the photosensitive body 1 are disposed on the optical axis in that order from the side near the rotating polygon mirror 9. Accordingly, the laser beam emitted from the laser diode 5 passes through the collimator lens 6, the cylinder lens 7, and the electrooptical element 11, is incident on the rotating polygon mirror 9, and is deflected by the rotating polygon mirror 9. In this way, the laser beam deflected by the rotating polygon mirror 9 is transmitted through the fθ lens 8, is reflected at the bend-back mirror 30, and scans the photosensitive body 1. Further, the direction in which the photosensitive body 1 is scanned by the laser beam deflected by the rotating polygon mirror 9 is called the main scanning direction, and the direction orthogonal to the main scanning direction is called the subscanning direction.

In the present embodiment, at each of the light scanning devices 2, an unillustrated temperature detecting means, which detects the temperature of a vicinity of the bend-back mirror 30 is disposed within the light scanning device 2. Further, the position at which the temperature detecting means is disposed is not limited to the vicinity of the bend-back mirror 30. For example, the vicinity of the laser diode 5 or the like is also fine. Moreover, the temperature detecting means is not limited to being disposed within the light scanning device 2, and may be disposed at a position outside of the light scanning device 2 at which detection of the temperature of the light scanning device 2 is possible. Further, the number of temperature detecting means may be one or more.

Further, although the electrooptical element 11 is disposed at a position before the rotating polygon mirror 9, if the electrooptical element 11 is disposed on the light path of the laser beam within the light scanning device 2, anywhere is fine.

Further, a mirror 10M is disposed in each light scanning device 2 at a predetermined position before the position of initial incidence on the image forming region of the photosensitive body 1 when the photosensitive body 1 is scanned by the laser beam. A horizontal synchronization sensor (SOS sensor) 10 serving as a position detecting means is provided on the optical axis of the laser beam reflected by the mirror 10M.

Figure 4B:
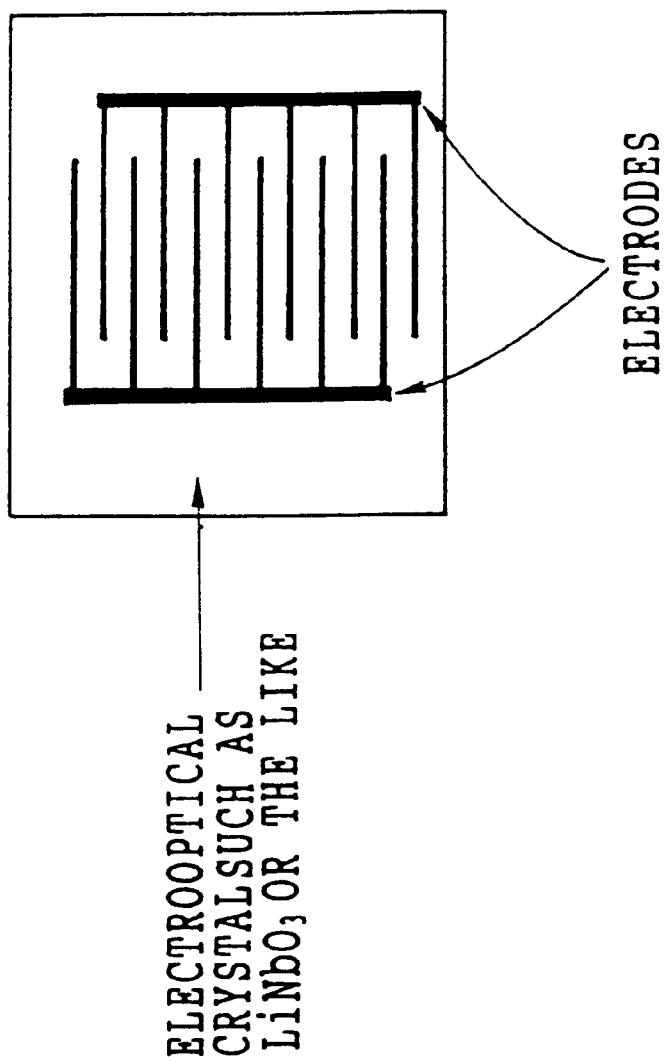
FIG. 4A and FIG. 4B are diagrams illustrating an electrooptical element.
Figure 4A:
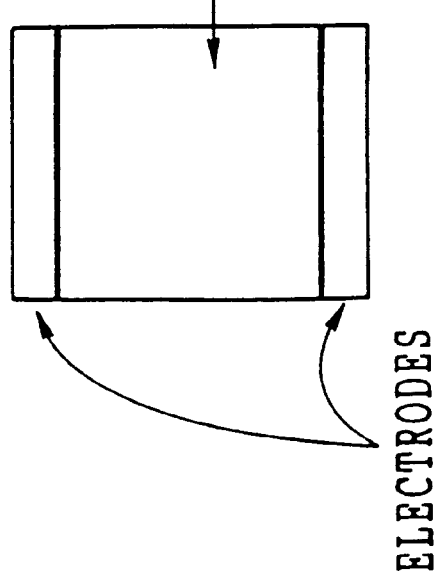

Next, the electrooptical element 11 will be described. Generally, the phenomenon of changing the refractive index by applying an electric field to a given material is called an electrooptical effect. $LiNbO_3$ crystal and the like are well-known as materials having the electrooptical effect. An electrooptical element applies an electric field to these materials from the exterior, and changes and utilizes the refractive index. Electrooptical elements are broadly classified into bulk types and waveguide types. In the present embodiment, the bulk type is used, but the present embodiment is not limited to the bulk type. Further, bulk-type electrooptical elements are broadly classified into two types, the opposing electrode type (see FIG. 4A) and the comb-shaped electrode type (see FIG. 4B), in accordance with the way the electrodes are provided. In the present embodiment, the opposing electrode type is used, but the present embodiment is not limited to this.

In accordance with the magnitude of the applied electric field (the magnitude of the applied voltage), the electrooptical element 11 linearly varies the subscanning direction deflection angle of the laser beam transmitted through the electrooptical element 11, as illustrated in FIG. 5. Further, the arranged positions of the laser diode 5, the collimator lens 6, the cylinder lens 7, the electrooptical element 11, the rotating polygon mirror 9, the fθ lens 8, the bend-back mirror 30, and the photosensitive body 1 are fixed. Accordingly, the position of the laser beam on the photosensitive body 1 also varies in accordance with the variations in the deflection angle of the laser beam. Namely, the position of the laser beam on the photosensitive body 1 (the scan line on the photosensitive body 1) varies in accordance with variations in the voltage applied to the electrooptical element 11.

Figure 6A:
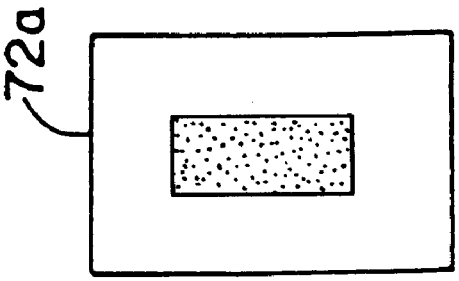
FIG. 6A is a diagram illustrating a horizontal synchronization sensor.
Figure 6B:
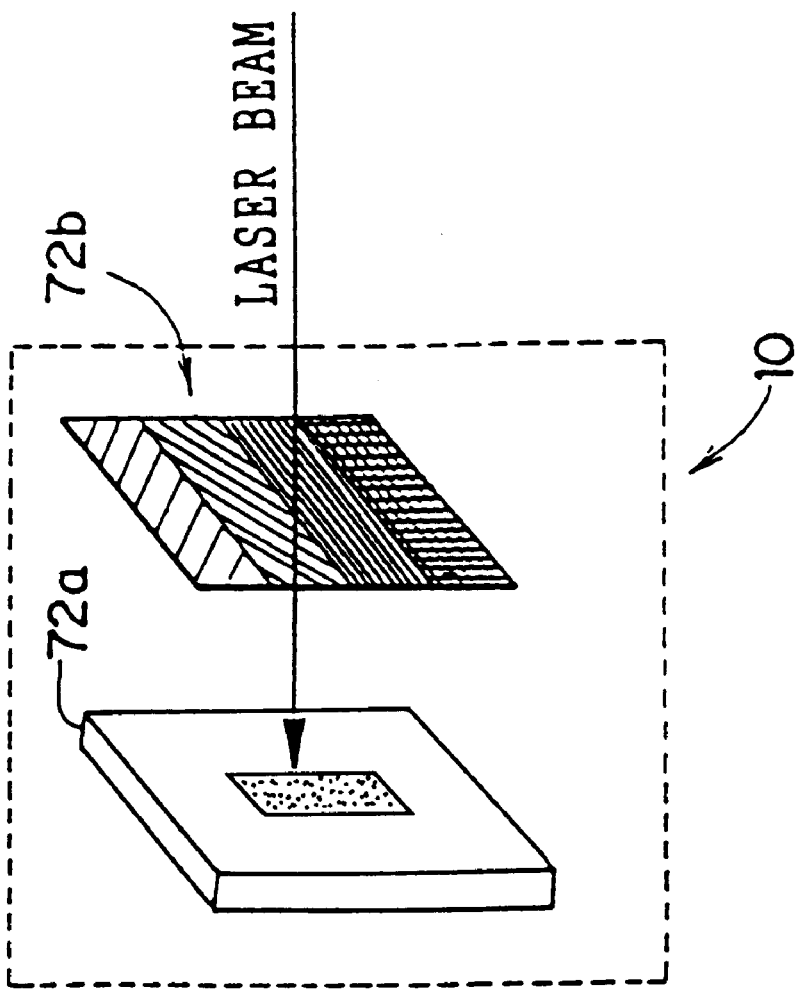
FIG. 6B is a diagram illustrating a surface at a light-receiving surface side of a light-receiving portion at the horizontal synchronization sensor.

Next, the horizontal synchronization sensor 10 will be described. In the present embodiment, as illustrated in FIG. 6A, the horizontal synchronization sensor 10 is provided with a lightreceiving portion (photodiode) 72a which light-receives the laser beam. The surface at the light-receiving surface side of the light-receiving portion 72a is illustrated in FIG. 6B. A gradation filter 72b whose density varies is disposed in the subscanning direction in a vicinity of the light-receiving surface of the light-receiving portion 72a. In this way, the horizontal synchronization sensor 10 can detect a height which will be described later.

Figure 7:
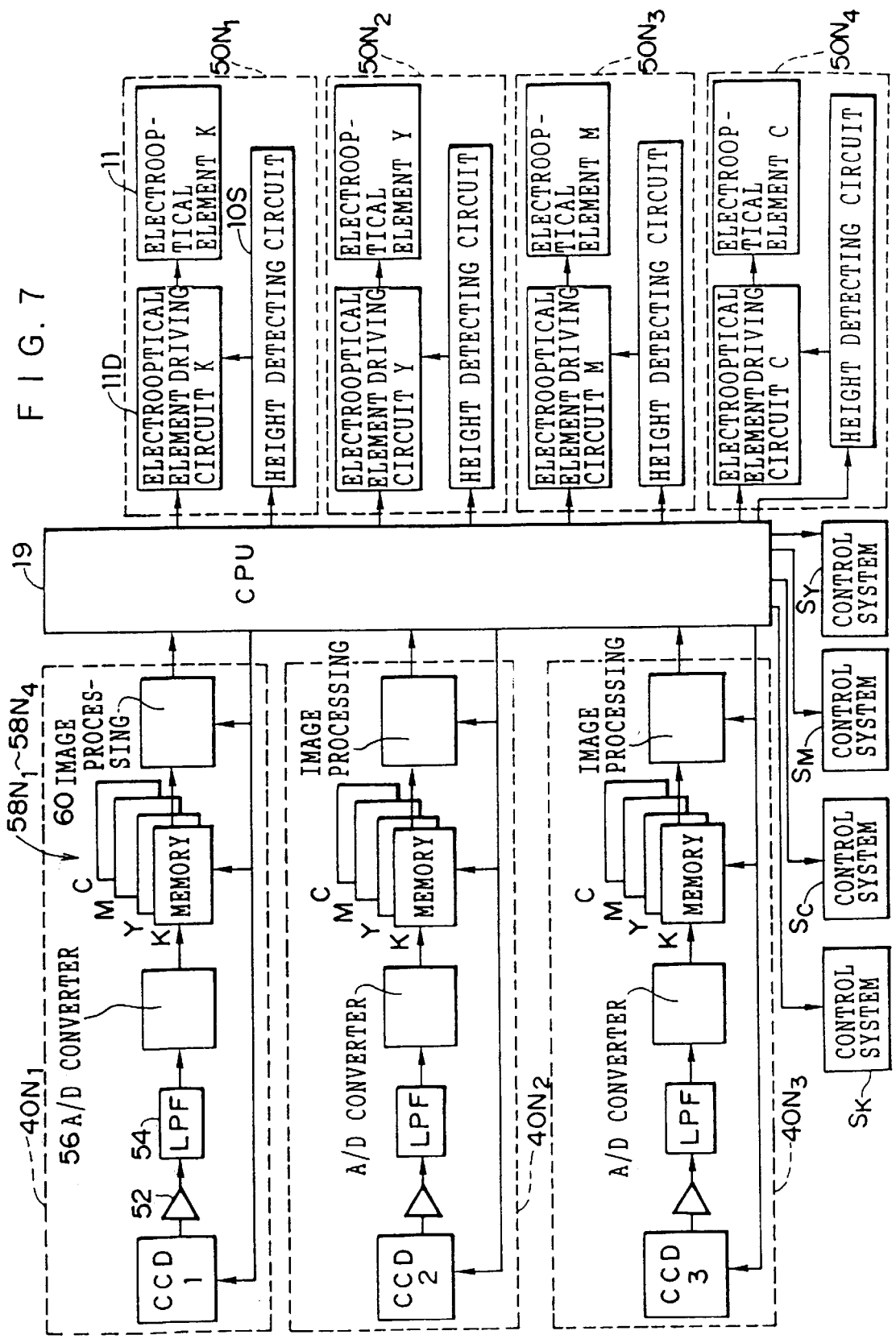
FIG. 7 is a block diagram illustrating a control system of the present embodiment.

Next, the control system of the present embodiment will be described. As illustrated in FIG. 7, the control system of the present embodiment is provided with a CPU 19. Image reading sections 40N1 through 40N3 are connected to the CPU 19 in correspondence with the CCD1 through CCD3 respectively. Further, driving sections 50N1 through 50N4 are connected to the CPU 19 in correspondence with the respective light scanning devices 2. Moreover, control systems $S_K$, $S_C$, $S_M$, $S_Y$ of the respective light scanning devices 2 are connected to the CPU 19.

Next, the image reading sections 40N1 through 40N3 will be described. However, because these have the same structure, only the image reading section 401N will be described, and other descriptions will be omitted. The image reading section 401N is provided with a CCD1 connected to the CPU 19, an amplifier (operational amplifier) 52 connected to the CCD1, and a low-pass filter 54 connected to the amplifier 50. An A/D converter 56 is connected to the low-pass filter 54. Memories 58N1 through 58N4 are connected to the A/D converter 58. An image processing circuit 60 is connected to the memories 58N1 through 58N4. The memories 58N1 through 58N4 and the image processing circuit 60 are connected to the CPU 19. Further, image data of the respective colors read by the CCD1 are stored in the corresponding memories 58N1 through 58N4.

Next, the driving sections 50N1 through 50N4 will be described. However, because these have the same structure, only the driving section 501N will be described, and other descriptions will be omitted. The driving section 501N is connected to the CPU 19, and is provided with an electrooptical element driving circuit 11D which varies the voltage applied to the electrooptical element 11 in accordance with control of the CPU 19, the electrooptical element 11 to which voltage is applied by the electrooptical element driving circuit 11D, and a height detecting circuit 10S which is connected to the CPU 19 and to the electrooptical element driving circuit 11D.

Here, height means the subscanning direction position of the laser beam.

Figure 8:
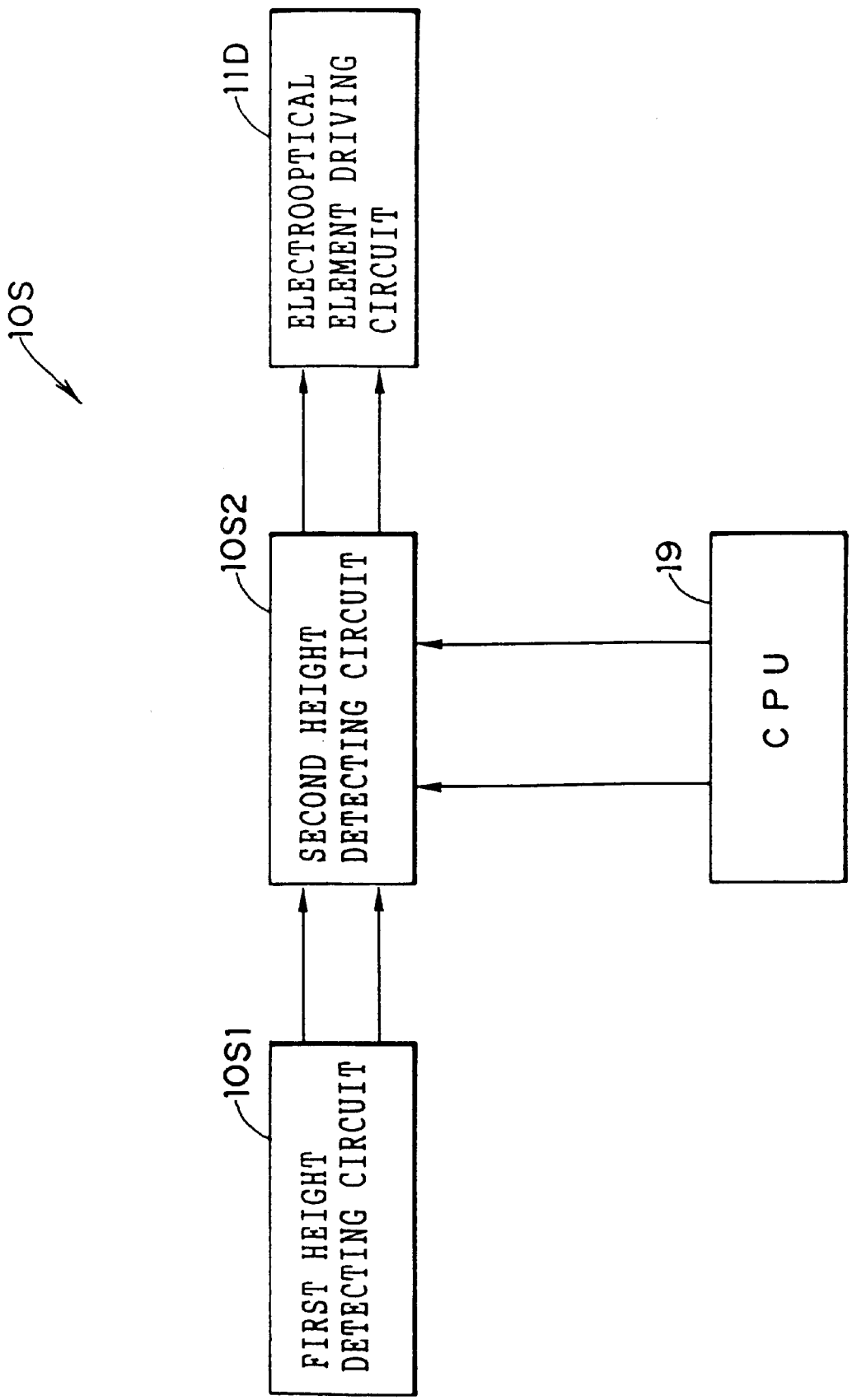
FIG. 8 is a block diagram illustrating a height detecting circuit.

As illustrated in FIG. 8, the height detecting circuit 10S is provided with a first height detecting circuit 10S1 and a second height detecting circuit 10S2 which is connected to the electrooptical element driving circuit 11D, the CPU 19 and the first height detecting circuit 10S1.

Figure 9:
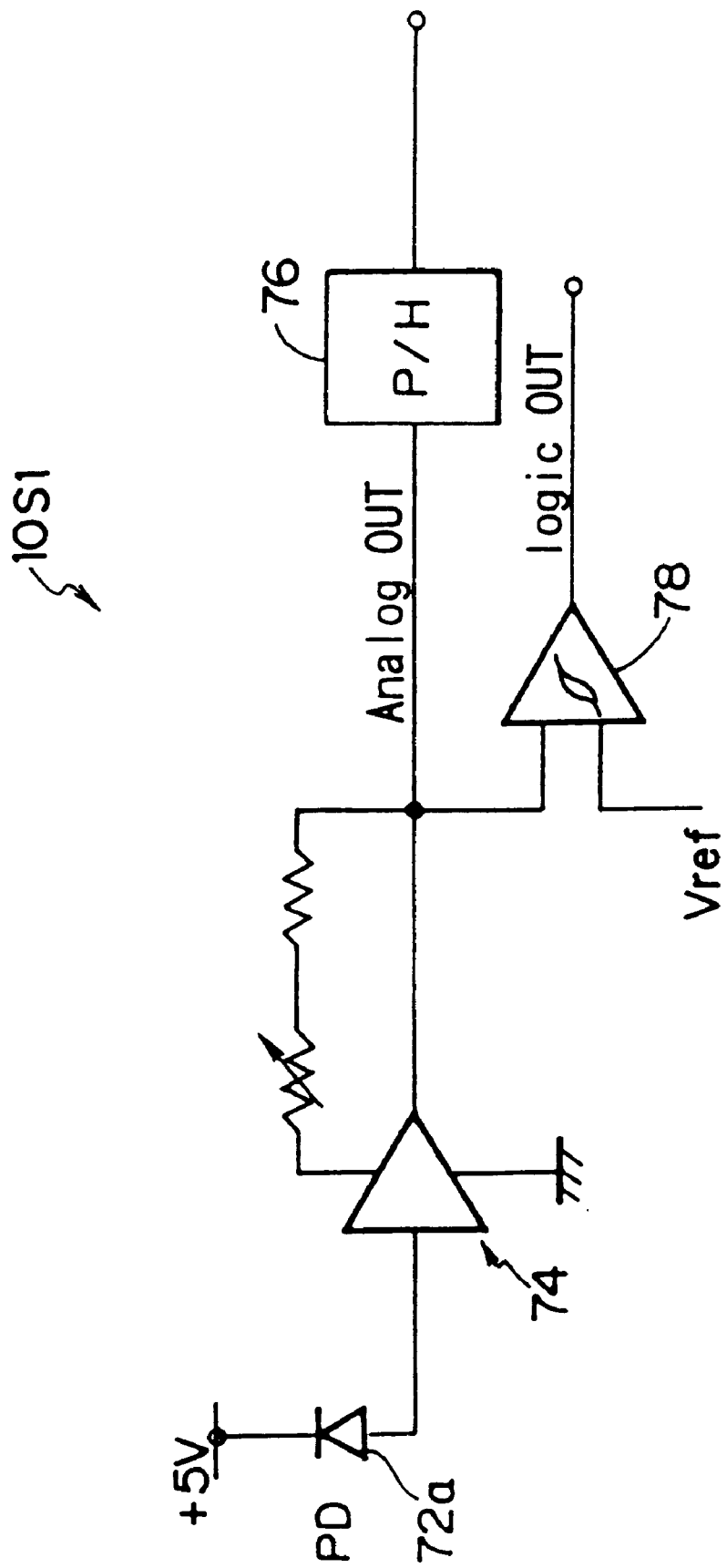
FIG. 9 is a block diagram illustrating a first height detecting circuit.

As illustrated in FIG. 9, the first height detecting circuit 10S1 is provided with the previously-mentioned light-receiving portion 72a. The amplifier 74 is connected to the light-receiving portion 72a. A peak hold circuit 76 and a comparator 78 are connected to the amplifier 74.

Figure 10:
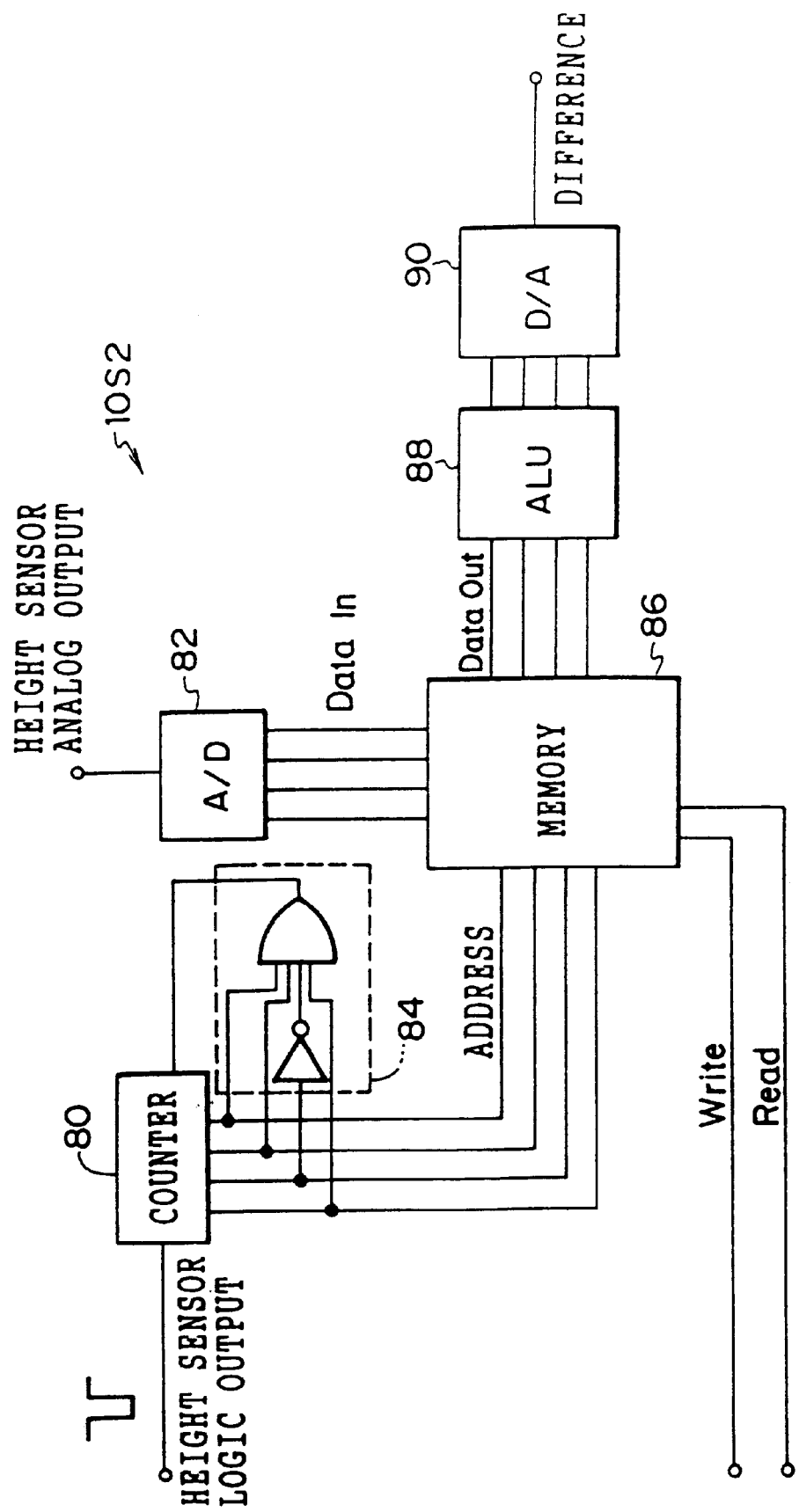
FIG. 10 is a block diagram illustrating a second height detecting circuit.

As illustrated in FIG. 10, the second height detecting circuit 10S2 is provided with an A/D converter 82 connected to the peak hold circuit 76, and a counter 80 connected to the comparator 78. A reset circuit 84 and a memory 86 are connected to the counter 80. The CPU 19 and the A/D converter 82 are also connected to the memory 86. Further, a computation circuit 88 is connected to the memory 86, and the electrooptical element driving circuit 11D is connected to the computation circuit 88 via a D/A converter 90.

Next, operation of the present embodiment will be described.

First, the color image forming process will be described. The respective light scanning devices 2 emit the laser beams by turning the laser diodes 5 on and off on the basis of the image information of the respective colors. The emitted laser beams are transmitted through the collimator lenses 6, the cylinder lenses 7, and the electrooptical elements 11, are incident on the rotating polygon mirrors 9, are deflected by the rotating polygon mirrors 9, are transmitted through the fθ lenses 8, are reflected by the bend-back mirrors 30, and are incident on the photosensitive bodies 1 such that electrostatic latent images are formed on the photosensitive bodies 1.

The electrostatic latent images formed on the respective photosensitive bodies 1 are, by the developing means 22, developed by coloring materials (toners) of colors corresponding to the respective photosensitive bodies 1 such that toner images 1 are formed. The toner images are superposed and transferred onto a sheet being conveyed by the conveying body 3 such that a color image is formed. The final color image is formed by fixing by the fixing means 25. Further, the respective photosensitive bodies 1 are cleaned by the cleaning means 26 so as to prepare for output of the next page.

On the other hand, when the photosensitive body 1 is scanned, the laser beam, which is directed toward a predetermined position before the position of initial incidence on the image forming region of the photosensitive body 1, is reflected by the mirror 10M and is made incident on the light-receiving portion 72a of the horizontal synchronization sensor 10.

The analog output of the light-receiving portion 72a is amplified by the amplifier 74, and the peak value thereof is detected by the peak hold circuit 76. This peak value is the value of the aforementioned height. Namely, the gradation filter 72b, whose density varies in the subscanning direction, is disposed at the light-receiving portion 72a. Therefore, the density portion position of the gradation filter 72b through which the laser beam passes varies in accordance with the height position. In this way, the amount of light received by the light-receiving portion 72a varies. Accordingly, the amount of light received by the light-receiving portion 72a corresponds to the density portion position of the gradation filter 72b, and the density portion position of the gradation filter 72b corresponds to the height position. Therefore, the amount of light received by the light-receiving portion 72a corresponds to the height position. Namely, the output from the light-receiving portion 72a can be associated with the height information. Further, instead of the gradation filter, a slit may be used. A plurality of light-receiving sensors may be provided, and the height information may be obtained from the ratio of the amounts of received light thereof.

The fluctuations in the height of the laser beam at one rotational cycle of the rotating polygon mirror 9 affect the image quality. Uneven color and variations in hue are conspicuous in color images in particular. In this way, in order to correct the height of the laser beam in accordance with the respective surfaces of the rotating polygon mirror 9, currently, it is necessary to know which surface is the surface deflecting the laser beam. Here, the logic signal from the comparator 78 illustrated in FIG. 9 is used as a clock, and the counter 80 illustrated in FIG. 10 repeatedly counts the total number of surfaces of the rotating polygon mirror 9. If the counter is a counter which can be set, it can be made to flexibly correspond to the respective surfaces. In addition, the surface which deflects the laser beam can be known as well by phase information of the motor driving the rotating polygon mirror 9, or by providing an encoder or the like. This counter value is inputted as an address corresponding to the memory 86, and simultaneously, input data (the peak value) which has been digital-converted by the A/D converter 82 is written into a region corresponding to that address. Further, the timing of the writing is determined by a write signal (write) from the CPU 19. Moreover, by outputting a read signal (read) to the memory 86, the heights of the laser beam corresponding to the respective surfaces deflecting the laser beam can be read. The heights of the laser beam corresponding to the respective surfaces and read in this way are inputted to the computation circuit 88, and at the computation circuit 88, an average value is computed and is used as a reference value. Then, in the correction of the height, the heights of the laser beam corresponding to the respective surfaces deflecting the laser beam are read in order from the memory 86, the read heights are compared to the aforementioned reference value, and a difference amount is computed. The difference amount is converted by the D/A converter 90, and is inputted to the electrooptical element driving circuit 11D. Voltage is applied as offset voltage to the electrooptical element 11 from the electrooptical element driving circuit 11D. In this way, the heights of the laser beam corresponding to the respective surfaces deflecting the laser beam are corrected to positions corresponding to the reference value.

Figure 11:
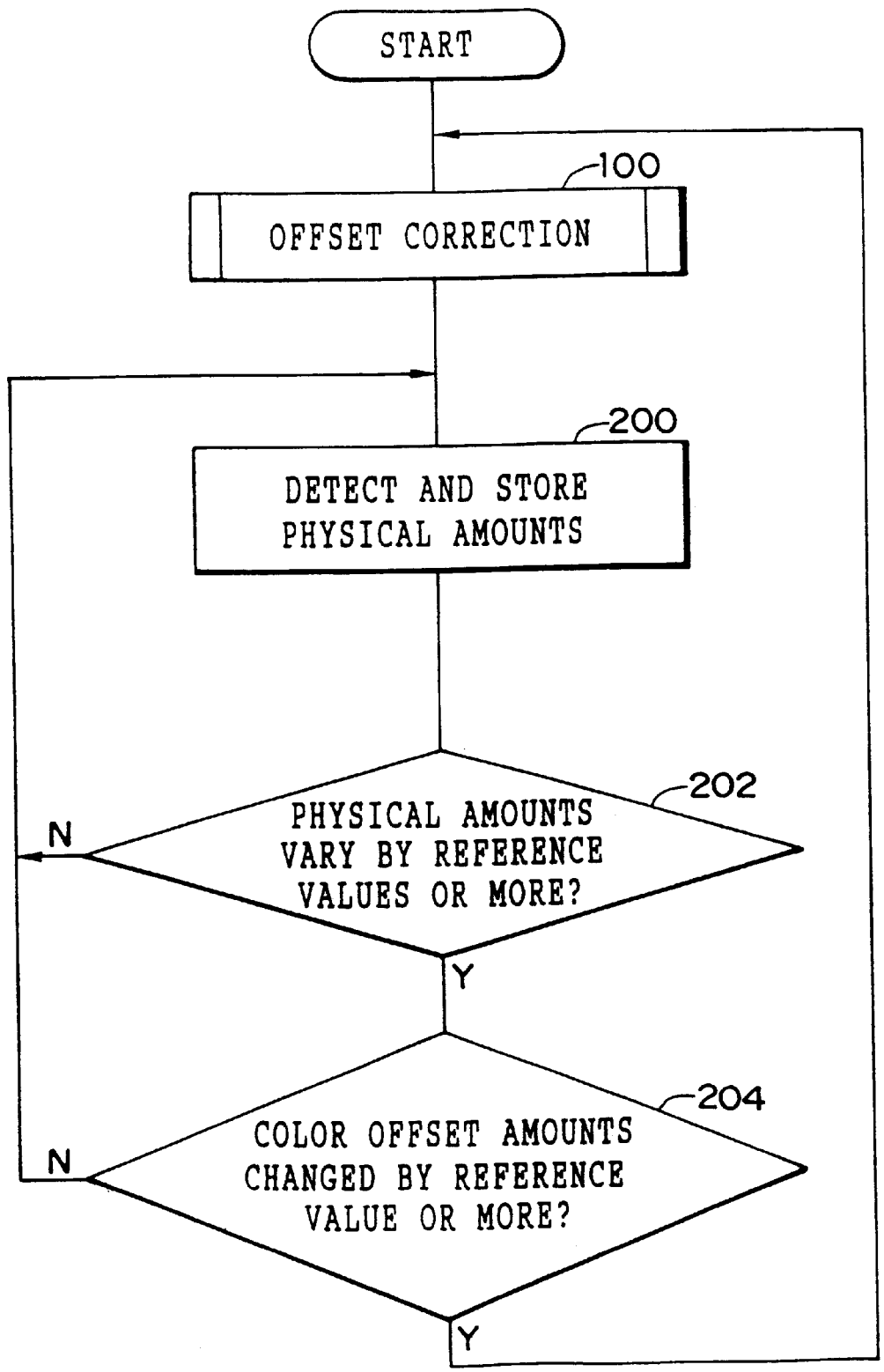
FIG. 11 is a flowchart illustrating a correction control routine of the present embodiment.

The correction control routine of the present embodiment is illustrated in FIG. 11. This routine is started when the power source is turned on. In step 100, offset correction processing is executed. In step 200, physical amounts for judging respective conditions which will be described later are stored.

Namely, in step 200, the temperatures of the vicinities of the bend-back mirrors 30 of the respective light scanning devices 2 and the above-described heights of the laser beams of the respective light scanning devices 2 are detected and stored.

Here, the temperature of a vicinity of the bend-back mirror 30 is detected by the previously-described temperature detecting means, and is stored.

Further, the aforementioned heights are detected by detecting the laser beam by the light-receiving portion 72a. Then, the output from the light-receiving portion 72a is stored in the memory 86 via the amplifier 74, the peak hold circuit 76 and the A/D converter 82.

In step 202, by judging whether the aforementioned stored physical amounts have changed, by reference values or more, from the physical amounts stored the previous time, it can be judged whether conditions have been established. Namely, it is judged whether the temperature of the vicinity of the bend-back mirror 30 has varied by a reference value (e.g., 3° C.) or more. If the temperature of the vicinity of the bend-back mirror 30 has not varied by the reference value or more, next, it is judged whether the aforementioned height has changed by a reference value (e.g., 1 pixel) or more between the respective light scanning devices 2.

If the physical amounts have not varied by the reference values or more, the routine returns to step 200, and the above processings (steps 200, 202) are executed.

On the other hand, if the physical amounts have changed by the reference values or more, namely, if the temperature of the vicinity of the bend-back mirror 30 has changed by the reference value or more or the above-described height is offset by one pixel or more between the respective light scanning devices 2, in step 204, a judgment is made as to whether the color offset amount has changed by the reference value or more. Namely, as will be described later, a patch image (the beginning position) formed by the respective light scanning devices 2 is read by the CCD 1, and it is judged whether the beginning positions (the central positions, the end positions or the like may be used) of the image forming regions of the photosensitive bodies of the respective light scanning devices 2 have varied by a reference value (e.g., one pixel) or more among the respective light scanning devices 2.

If the color offset amounts change by the reference value or more, the routine returns to step 100, and offset correction processing is executed. Further, when the color offset amounts do not change by the reference value or more, the routine returns to step 200, and the above processings (steps 200 through 204) are executed.

Next, offset correction processing will be explained in accordance with the flowchart shown in FIG. 12.

Here, when offset correction is carried out by the electrooptical element 11, it is necessary to know in advance the subscanning direction displacement amounts of the laser beams with respect to the voltages applied to the electrooptical elements 11 of the respective light scanning devices 2.

First, when voltage $V_1(V)$ is applied to the respective electrooptical elements 11, the subscanning direction positions of the respective laser beams at the time when voltage $V_2(V)$ is applied are read by the CCDs. As illustrated in FIG. 5, the voltage applied to the electrooptical element and the deflection angle of the laser beam transmitted through the electrooptical element exhibit a substantially linear characteristic. Therefore, a two point $(V_1(V), V_2(V))$ laser beam deflection angle can be obtained. The subscanning direction displacement amounts of the beams can be related to the voltages applied to the respective electrooptical elements.

Namely, for example, if the deflection angles at two points of the light scanning device 2 for the Y color are $\theta_1$, $\theta_2$, because $\theta = \alpha y \cdot V$, the skew $\alpha y = (\theta_2 - \theta_1)/(V_2 - V_1)$ is obtained. Further, the skews ($\alpha k$, $\alpha m$, $\alpha c$) of the other colors (M, C, K) are carried out in the same way. These skews are stored in advance.

In this way, it is known for each light scanning device 2 how much the deflection angle of the laser beam varies for how much voltage is applied to the electrooptical element 11. Accordingly, if the amount by which the position of the laser beam should be moved is known, it is known how much the deflection angle of the laser beam should be varied, and the voltage applied to the electrooptical element 11 is known.

Figure 12:
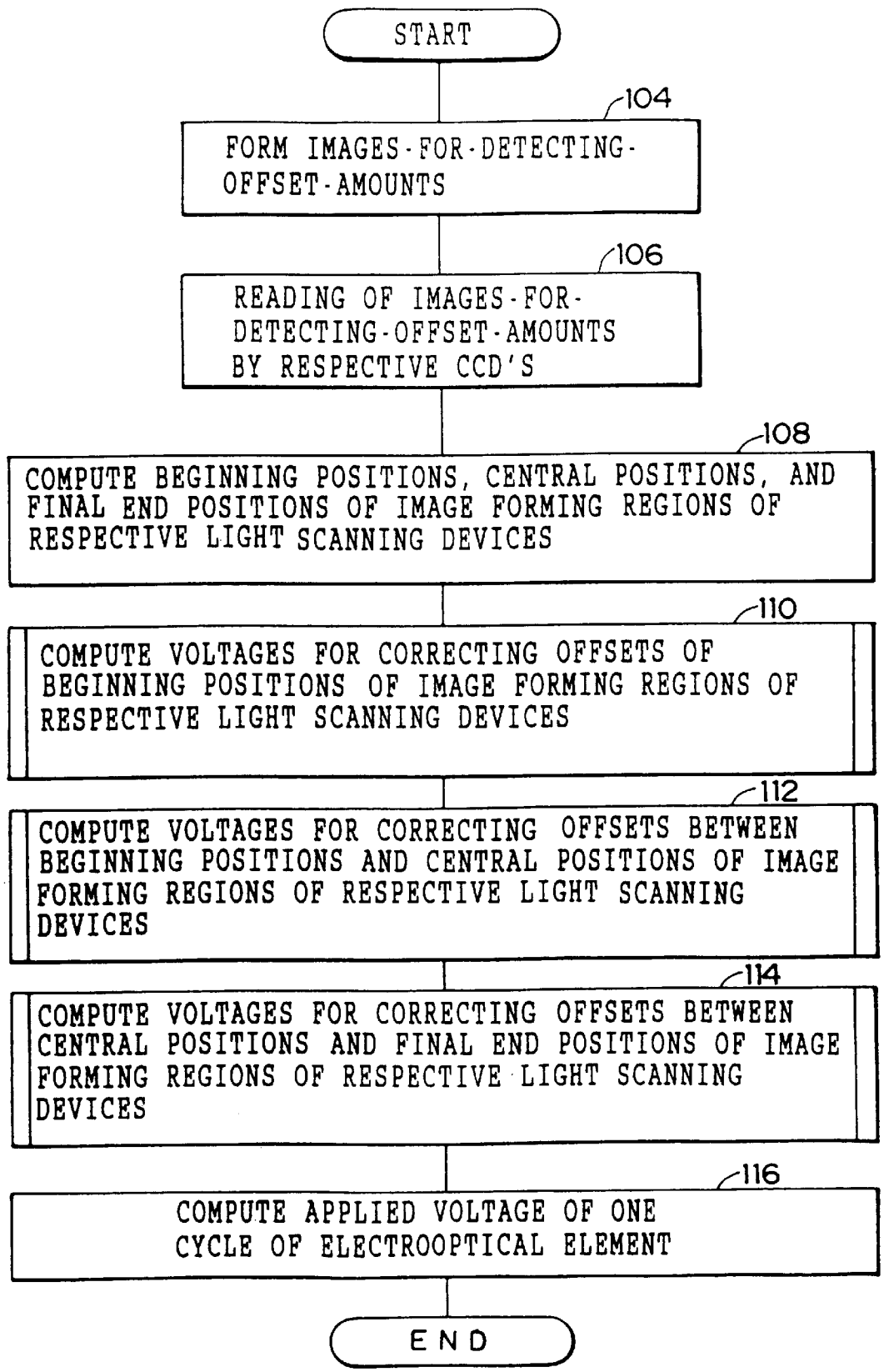
FIG. 12 is a flowchart illustrating the subroutine of step 100 of FIG. 11.

In step 104 of FIG. 12, images-for-detecting-offset-amounts are formed. Namely, certain prescribed Y, M, C, K images of registration offset patches, which are the images-for-detecting-offset-amounts, are written by the respective light scanning devices on the respective photosensitive bodies 1 by the respective light scanning devices 2, and are developed by the respective developing means. These are transferred to respective separated positions on the conveying body 3 which is moving at a uniform speed. In this way, the Y, M, C, K four-color toner images (patch images) are formed at separated positions on the conveying body 3. In step 106, as illustrated in FIG. 2, the patch images are read by the respective CCD1 through CCD 3 at times of passing by that CCD1, CCD2, CCD3. In step 108, the beginning position, central position, and final end position of the image forming region on the transfer medium are computed by the respective light scanning devices 2.

The beginning positions of the light scanning devices 2 for each color Y, M, C, K read by the CCD1 are respectively Yy1, Ym1, Yc1, Yk1. The central positions of the light scanning devices 2 for each color Y, M, C, K read by the CCD2 are respectively Yy2, Ym2, Yc2, Yk2. The final end positions of the light scanning devices 2 of each color Y, M, C, K read by the CCD3 are respectively Yy3, Ym3, Yc3, Yk3.

In step 110, the voltages for correcting the offsets, among the respective light scanning devices 2, of beginning positions of image forming regions on the transfer medium by the respective light scanning devices 2 are computed.

Figure 13:
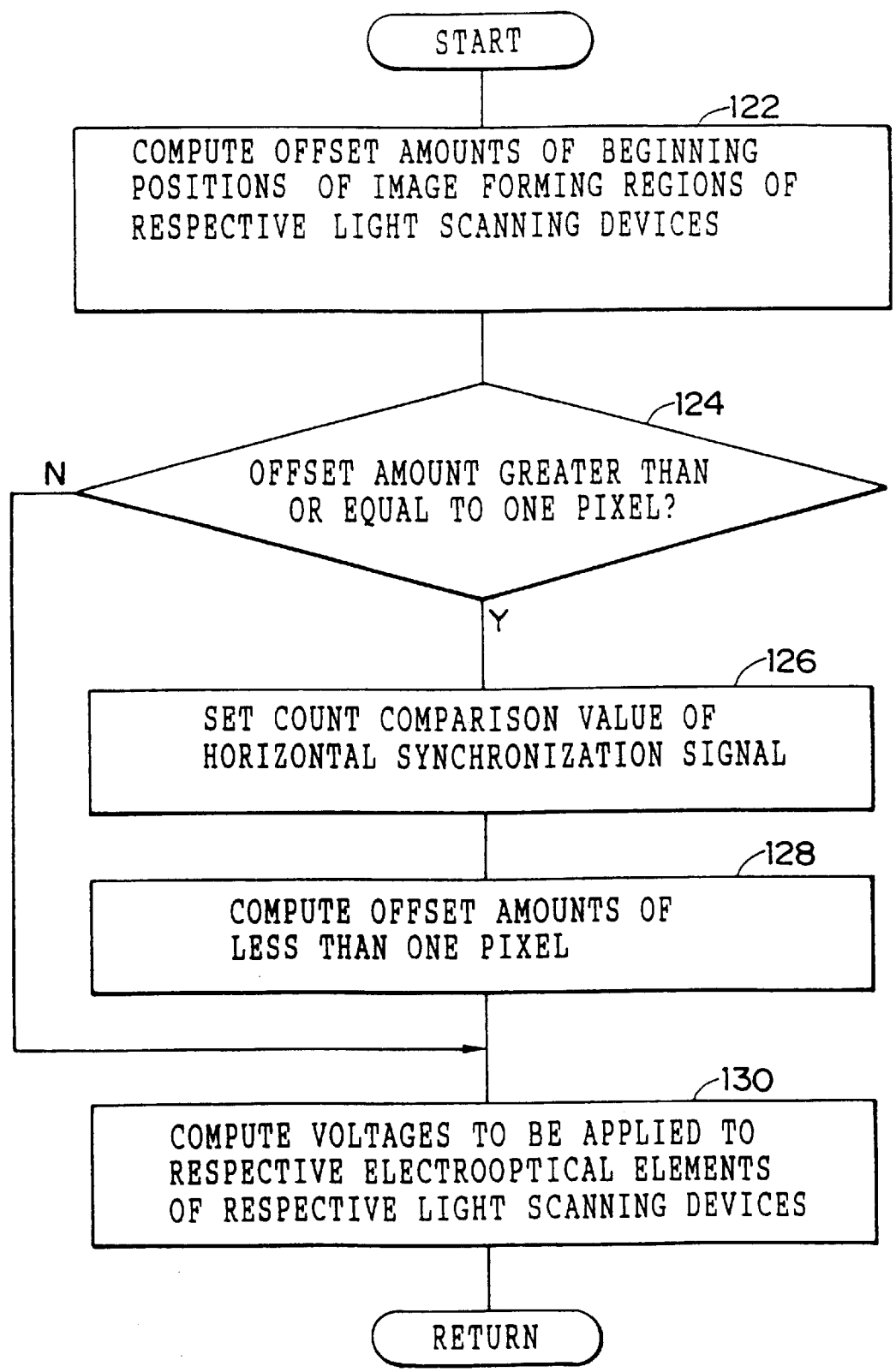
FIG. 13 is a flowchart illustrating the subroutine of step 110 of FIG. 12.

Here, step 110 will be described in accordance with the flowchart of FIG. 13. In step 122 of FIG. 13, the offset amounts of the beginning positions of the image forming regions of the respective light scanning devices are computed.

Namely, with the beginning position Yk1 of the respective light scanning devices 2 of the K color as a reference, the offset amounts [(Yy1−Yk1), (Ym1−Yk1), and (Yc1−Yk1)] of the other beginning positions are computed. Further, the present invention is not limited to using the beginning position Yk1 as a reference, and the beginning position of another color (Yy1, Ym1, and Yc1) may be used as the reference.

In subsequent step 124, it is judged whether the computed offset amount is greater than or equal to one pixel. Further, present step 124 corresponds to the judging means of the present invention. In a case in which the offset amount is less than one pixel, the routine proceeds to step 130, and in a case in which the offset amount is greater than or equal to one pixel, in step 126, a count comparison value of a horizontal synchronization signal is set.

Namely, the count comparison value of the horizontal synchronization signal for determining the timing (lead registration) for starting subscanning direction writing is computed from the following formula, using, for example, the light scanning device 2 for Y color as an example.

(initially set predetermined value)+(quotient of ((Yy1−Yk1)÷one pixel))

Each light scanning device starts image writing from the next horizontal synchronization signal after the count value of the horizontal synchronization signal becomes the count comparison value from the point in time when the writing start signal (page sync signal) is generated. For example, in a case in which the resolution is 400 SPI (spot per inch), one pixel is 63.5 μm. Namely, the second term of the above formula of the count comparison value means that the image writing timing is adjusted by one pixel unit (63.5 μm) with respect to the subscanning direction.

In step 128, the offset amounts of less than one pixel are computed. Namely, for example, the remainder of ((Yy1−Yk1)÷one pixel)) is computed.

In step 130, the voltages to be applied to the respective electrooptical elements of the respective light scanning devices are set. Namely, the deflection angles of the laser beams are computed from the offset amounts of less than one pixel, and voltages corresponding to the deflection angles are computed on the basis of the computed deflection angles and the previously-described skews ($\alpha y$, $\alpha k$, $\alpha m$, $\alpha c$).

In subsequent step 112 (see FIG. 12), the voltages for correcting the offsets between the beginning positions and the central positions are computed, and in step 114, the voltages for correcting the offsets between the central positions and the final end positions are computed. Further, in steps 112, 114, processing is carried out in the same way as in step 110. Namely, in step 112, voltages of skews corresponding to the differences (Yy2−Yy1), (Ym2−Ym1), (Yc2−Yc1), (Yk2−Yk1) in the offset amounts by detection by the CCD1 and the CCD2 are computed. Further, in a case in which the offset amount is greater than or equal to one pixel, the count comparison value of the horizontal synchronization signal is set as described above. In step 114, voltages of skews corresponding to the differences (Yy3−Yy2), (Ym3−Ym2), (Yc3−Yc2), (Yk3−Yk2) in the offset amounts by detection of the CCD2 and the CCD3 are computed. Further, in a case in which the amount of offset is greater than or equal to one pixel, the count comparison value of the horizontal synchronization signal is set as described above.

In step 116, the applied voltage of one cycle of the electrooptical element is computed on the basis of the voltage computed in step 110 through step 114. Namely, as illustrated in FIG. 14, the voltage waveform of one surface cycle of the rotating polygon mirror 9 is computed.

For example, the voltage waveform of the light scanning device 2 for the K color is computed as illustrated in FIG. 14A. Namely, as described previously, with the beginning position of the light scanning device 2 for the K color as a reference, the offsets of the beginning positions of the light scanning devices 2 for the other colors are corrected. Therefore, the set voltage of the beginning position is the initial voltage $v_{k1}$, and at the beginning position, as illustrated in FIGS. 14A, it remains $v_{k1}$. At the central position, a voltage $v_{k2}$ corresponding to the deflection angle computed in accordance with (Yk2−Yk1) is set. At the final end position, a voltage $v_{k3}$ corresponding to the deflection angle computed in accordance with (Yk3−Yk2) is set. Then, the applied voltages of one cycle of the electrooptical element are computed from voltage $v_{k1}$, voltage $v_{k2}$, voltage $v_{k3}$ such that the waveform of the applied voltage of one cycle of the electrooptical element becomes sawtooth-shaped. With respect to the voltage waveforms of the light scanning devices 2 for the other colors (Y, M, C), the voltage waveforms of one surface cycle of the polygon mirrors 9 are computed in the same way, as illustrated in FIG. 14B through FIG. 14D.

Further, the waveform of the applied voltage of one cycle of the electrooptical element is not limited to being computed to a sawtooth-shape, and may be computed to a bow-shape.

Further, the electrooptical element 11 is controlled by the computed voltage as described above. Therefore, as illustrated in FIG. 15A, the offset amount of the beginning position of each light scanning device is corrected so as to become a value in a predetermined range (0 in the present embodiment) by the present processing. Accordingly, as illustrated in FIG. 15B, the respective beginning positions coincide.

Voltages of the voltage waveforms illustrated in FIGS. 14B through FIG. 14D are applied per scan line. Therefore, the respective scan lines, which are illustrated in FIG. 15B and include the central positions and the final end positions of the respective light scanning devices, are corrected so as to coincide as illustrated in FIG. 15C.

As described above, the offsets among the respective lines on the transfer medium corresponding respectively to the scan lines of the photosensitive bodies 1 of the light scanning devices 2 of the respective colors can be corrected, and at the same time, bowing of the scan lines of the light scanning devices themselves of the respective colors can be corrected.

Due to unevenness in the raising of the temperatures of the respective light scanning devices and the like, it is possible that only the light paths of the light scanning devices of certain colors are greatly offset due to the above-described correction, and the correction amounts by the electrooptical elements of only the light scanning devices of these colors will increase. As a result, there is the concern that the scan position of the laser beam may miss the light-receiving surface of the horizontal synchronization sensor, namely, that horizontal synchronization cannot be achieved.

Here, in the above-described step 116, voltages $V_{SOSC}$, $V_{SOSK}$, and the like, which are applied to the electrooptical elements in order for the laser beams to pass through the horizontal synchronization sensors, are detected in advance, and voltages of one surface cycle of the rotating polygon mirrors 9 are computed such that the detected voltages $V_{SOSC}$, $V_{SOSK}$, and the like are applied to the electrooptical elements at a timing of times at which the laser beams of the respective light scanning devices pass through on the horizontal synchronization sensors, as in the timing charts illustrated in FIG. 16A through FIG. 16C. Namely, as illustrated in FIG. 16B, the voltage $V_{SOSC}$ is applied to the electrooptical element of the light scanning device for cyan at the timing of the time at which the laser beams of the respective light scanning devices pass through on the horizontal synchronization sensors. As illustrated in FIG. 16C, the voltage $V_{SOSK}$ is applied to the electrooptical element of the light scanning device for black at the timing of the time at which the laser beams of the respective light scanning devices pass through on the horizontal synchronization sensors. The others are similar.

In the above-described embodiment, respective positions which are the beginning positions, the central positions, and the final end positions of the image forming regions are detected, and the offset amounts among the respective lines on the transfer medium corresponding to the respective scan lines of the photosensitive bodies 1 of the light scanning devices 2 of the respective colors are computed. However, the present invention is not limited to the same, and respective positions which are the beginning positions and the final end positions of the image forming regions may be detected, and the offset amounts among the respective lines on the transfer medium corresponding to the respective scan lines of the photosensitive bodies 1 of the light scanning devices 2 of the respective colors may be computed. In this way, the offsets among the respective lines on the transfer medium corresponding to the respective scan lines of the photosensitive bodies 1 of the light scanning devices 2 of the respective colors can be corrected, and the skewing of the scan lines of the light scanning devices themselves of the respective colors can be corrected at the same time.

Namely, on the basis of the image data read by the CCD1 and the CCD3, as described previously, the beginning positions (Yy1, Ym1, Yc1, Yk1) and the final end positions (Yy3, Ym3, Yc3, Yk3) are detected. With the beginning position Yk1 of the respective light scanning devices 2 of K as a reference, the offset amounts of the other beginning positions [(Yy1−Yk1), (Ym1−Yk1), and (Yc1−Yk1)] are computed. It is judged whether the computed offset amount is greater than or equal to one pixel. In a case in which the offset amount is greater than or equal to one pixel, as described above, the count comparison value of the horizontal synchronization signal is set. On the other hand, in a case in which the offset amount is less than one pixel, the deflection angle of the laser beam is computed from the offset amount, and the voltage corresponding to the deflection angle is computed on the basis of the computed deflection angle and the above-described skew ($\alpha y$, $\alpha k$, $\alpha m$, $\alpha c$).

Next, voltages of the skews corresponding to the differences (Yy3−Yy1), (Ym3−Ym1), (Yc3−Yc1), (Yk3−Yk1) of the offset amounts by the detection of the CCD1 and the CCD3 are computed.

Then, applied voltages of one cycle of the electrooptical elements are computed on the basis of the computed voltages at each of the beginning positions and the final end positions.

In this case as well, the applied voltages are computed to become the voltage waveforms of one surface cycle of the rotating polygon mirrors 9 as illustrated in FIG. 17. For example, as illustrated in FIG. 17A, with regard to the voltage waveform of the light scanning device 2 for the K color, the set voltage of the beginning position is the initial voltage $v_{k1}$, and at the final end position, a voltage $v_{k3}$ corresponding to the deflection angle computed in accordance with (Yk3−Yk1) is set. Then, the voltage between the beginning position and the final end position is computed to a sawtooth-shape or a bow-shape as described above. Further, in this case as well, as described previously, voltages $V_{SOSC}$, $V_{SOSK}$, and the like, which are applied to the electrooptical elements in order for the laser beams to pass through the horizontal synchronization sensors, are detected in advance, and voltages of one surface cycle of the rotating polygon mirrors 9 are computed such that the detected voltages $V_{SOSC}$, $V_{SOSK}$, and the like are applied to the electrooptical elements at a timing of times at which the laser beams of the respective light scanning devices pass through on the horizontal synchronization sensors, as in the timing charts illustrated in FIG. 16. Further, with regard to the voltage waveforms of the light scanning devices 2 for the other colors (Y, M, C), the voltage waveforms of one surface cycle of the rotating polygon mirrors 9 are computed in the same way, as illustrated in FIGS. 17B through 17D.

Then, by applying the voltages of the beginning positions to the electrooptical elements, the offset amounts of the beginning positions of the respective light scanning devices illustrated in FIG. 18A are corrected such that the respective beginning positions coincide as illustrated in FIG. 18B.

Further, by applying the voltages of the final end positions to the electrooptical elements, the offset amounts of the final end positions of the respective light scanning devices illustrated in FIG. 18B are corrected such that the final end positions coincide as illustrated in FIG. 18C.

Accordingly, the offsets between the respective lines on the transfer medium corresponding to the respective scan lines of the photosensitive bodies 1 of the light scanning devices 2 of the respective colors can be corrected, and the skew of the scan lines of the light scanning devices themselves of the respective colors can be corrected at the same time.

In the above-described embodiment, the offset amounts can be corrected by controlling the voltages applied to the electrooptical elements. Therefore, correction can be effected precisely in a short time even for offset of less than one pixel.

Further, in the above-described embodiment, because subscanning direction offset and the skewing, bowing and the like of the respective light scanning devices are controlled independently, the correction cycle time can be shortened. As a result, for example, if color images are formed in order on plural sheets being conveyed continuously by the conveying body, and the patch images are formed on the transfer body between the respective sheets, and correction is carried out in the above-described manner, correction during the print cycle, which could not be achieved by the conventional art, becomes possible.

Further, the patch images are formed on the transfer body, and are not formed on the sheets. Therefore, useless waste of sheets can be prevented merely by carrying out such correction.

Moreover, because the present invention is not large-scale as a device and can be accommodated in current light scanning devices, it does not take up space.

Further, with regard to the correction of bowing of the scan lines which relied on the precision of manufacturing of conventional optical parts, electrical correction is made possible, and therefore, a better image forming device can be provided.

Figure 19:
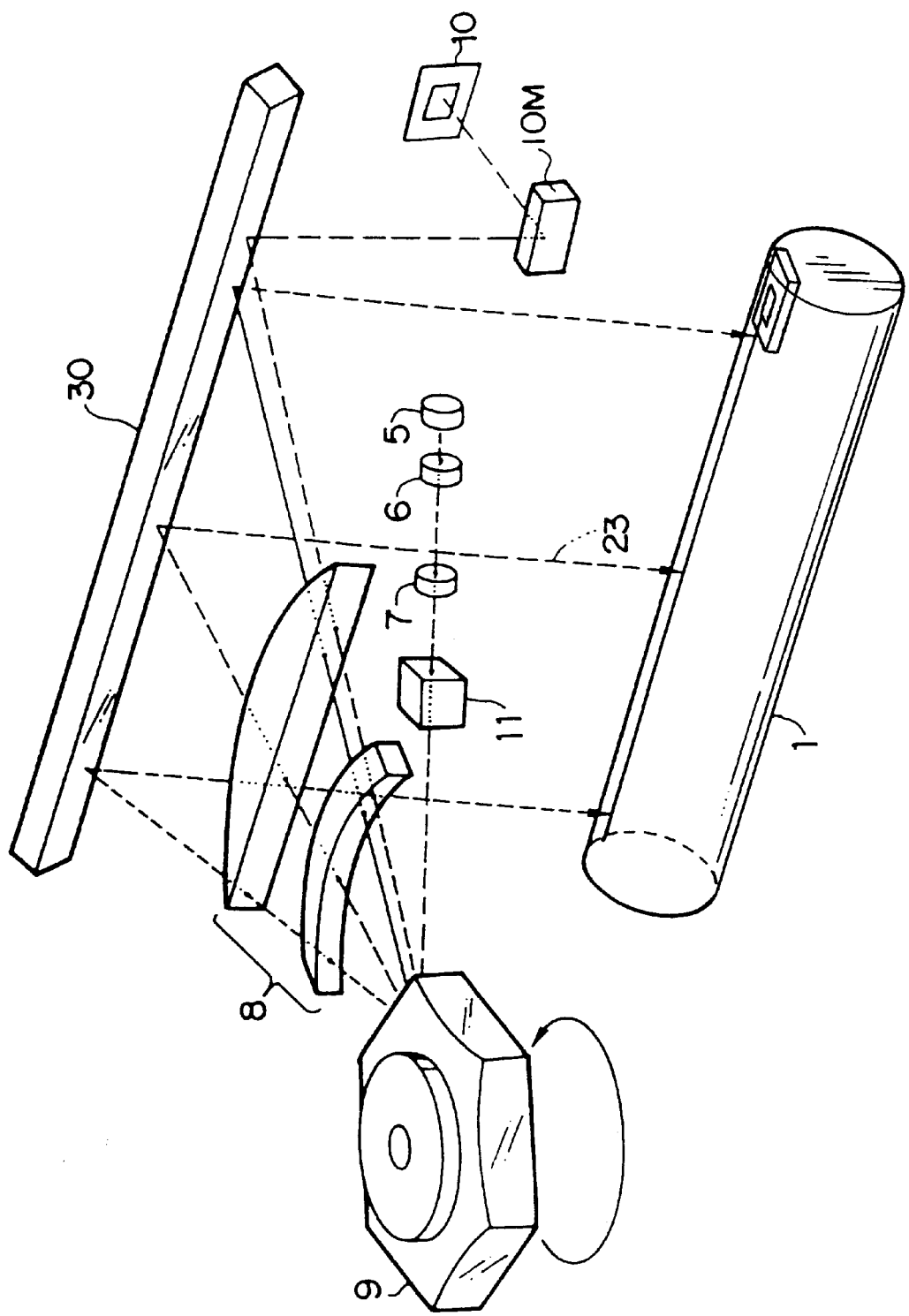
FIG. 19 is a block diagram illustrating a variant example of the light scanning device.

In the above-described embodiment, the horizontal synchronization sensor detects the height position of the laser beam. However, the present invention is not limited to the same. In addition to the horizontal synchronization sensor, as illustrated in FIG. 19, a light detector 20 may be provided which has a similar structure as that of the horizontal synchronization sensor and whose light receiving portion is positioned on the same plane as the surface of the photosensitive body and at a predetermined position before the position of initial incidence onto the image forming region of the photosensitive body and at a predetermined position after the position of final incidence. The light detector 20 corresponds to the light beam detecting means of the present invention.

Further, in the above-described embodiments, with the beginning position of any of the light scanning devices as a reference, the offset amounts of the other beginning positions are computed. However, the present invention is not limited to the same, and computation may be carried out with a predetermined position on the conveying body as a reference. Namely, for example, given markings are provided at the positions on the conveying body on which the patch images are formed, the markings are read, and computation is carried out with the offset amounts of the beginning positions as the offset amounts from these markings.

In the previously-described embodiments, the CCDs are disposed at the beginning position, the central position, and the final end position, and patch images are formed at the beginning position, the central position and the final end position, or at the beginning position and the final end position, for each of the light scanning devices. However, the present invention is not limited to the same. CCDS may be disposed at a plurality of positions within the image forming region (other than the beginning position, the central position, and the final end position), and patch images may be formed at the plurality of positions.

Further, in the above-described embodiments, the patch images are formed on the conveying body. However, the present invention is not limited to the same, and the patch images may be formed on sheets conveyed by the conveying body.

Moreover, in the above-described embodiments, an example using polygon mirrors is described. However, the present invention is not limited to the same, and galvanometer mirrors or the like may be used.

Further, in the above-described embodiments, an example using laser diodes is described. However, the present invention is not limited to the same, and LEDs or the like may be used.

What is claimed is:

1. A color image forming apparatus comprising:
   a plurality of photosensitive bodies provided in correspondence with colors to be developed;
   a plurality of light scanning means, disposed in correspondence with said plurality of photosensitive bodies respectively, for scanning light beams by deflecting the light beams in a predetermined direction so as to form electrostatic latent images on said photosensitive bodies;
   a plurality of developing means for developing the electrostatic latent images formed on said respective photosensitive bodies, respectively, by coloring materials of colors corresponding to said respective photosensitive bodies;
   transfer means for superposing together and transferring the developed images of respective colors onto a transfer medium;
   electrooptical elements disposed on light paths of the light beams emitted by said plurality of light scanning means, and deflecting, by amounts corresponding to applied voltages, the light beams transmitted therethrough;
   voltage applying means for applying voltages to said electrooptical elements;
   offset amount detecting means for detecting images-for-detecting-offset-amounts which are formed on the transfer medium by said plurality of light scanning means, said plurality of developing means, and said transfer means, so as to detect offset amounts of the images of the respective colors; and
   control means for, on the basis of the detected offset amounts, controlling said voltage applying means to apply to said respective electrooptical elements voltages for making the offset amounts of the images of the respective colors values within a predetermined range.

2. A color image forming apparatus according to claim 1, wherein the transfer medium is a conveying body which conveys a medium on which an image is to be formed such that the medium on which the image is to be formed contacts said respective photosensitive bodies in order.

3. A color image forming apparatus according to claim 2, wherein the conveying body is an endless belt.

4. A color image forming apparatus according to claim 2, wherein images-for-detecting-offset-amounts are formed, by said plurality of light scanning means, said plurality of developing means, and said transfer means, on the transfer medium between plural media on which images are to be formed which are conveyed at predetermined intervals by the transfer medium.

5. A color image forming apparatus according to claim 1, wherein said offset amount detecting means detects a plurality of images-for-detecting-offset-amounts which are formed by said plurality of light scanning means, said plurality of developing means, and said transfer means, at plural positions aligned along a direction corresponding to the predetermined direction on the transfer medium, and on the basis of the detected plurality of images-for-detecting-offset-amounts, said offset amount detecting means detects skews or amounts of bowing of respective scan lines of the predetermined direction of said respective photosensitive bodies, and detects offset amounts of the images of the respective colors.

6. A color image forming apparatus according to claim 5, wherein said offset amount detecting means detects positions of the images of the respective colors of the plurality of images-for-detecting-offset-amounts, and detects skews or amounts of bowing of respective scan lines on the transfer medium.

7. A color image forming apparatus according to claim 1, wherein said offset amount detecting means detects the offset amounts by using as a reference a predetermined position on the transfer medium or any one image of the images of the respective colors.

8. A color image forming apparatus according to claim 1, further comprising:
   condition establishment judging means for judging whether a predetermined condition for said control is established,
   wherein in a case in which it is judged by said condition establishment judging means that a condition is established, said control means effects said control.

9. A color image forming apparatus according to claim 1, further comprising:
   position detecting means for detecting positions of scan lines of said respective photosensitive bodies,
   wherein said control means computes displacement amounts of the detected positions each time the light beams are deflected, and on the basis of the computed displacement amounts, said control means again controls said voltage applying means to apply to said respective electrooptical elements voltages for the displacement amounts to become values of a predetermined range.

10. A color image forming apparatus according to claim 9, wherein said position detecting means detects light beams passing through predetermined positions before positions of initial incidence on image forming regions of said respective photosensitive bodies;

said plurality of light scanning means adjust timing of emission of the light beams, on the basis of detection of the light beams by said position detecting means; and said control means controls said voltage applying means such that voltages, of magnitudes detected in advance and for the light beams passing through said electrooptical elements to pass through the predetermined positions, are applied to said electrooptical elements at a timing at which the light beams pass through the predetermined positions.

11. A color image forming apparatus according to claim 9, wherein said position detecting means includes:

light-receiving means for light-receiving light beams changed by said light scanning means; and a gradation filter whose density in a direction intersecting the predetermined direction varies so as to cover a vicinity of a light-receiving surface of said light-receiving means and the light-receiving surface.

12. A color image forming apparatus comprising:

a plurality of photosensitive bodies provided in correspondence with colors to be developed;

a plurality of light scanning means, disposed in correspondence with said plurality of photosensitive bodies respectively, for scanning light beams by deflecting the light beams in a predetermined direction so as to form electrostatic latent images on said photosensitive bodies;

a plurality of developing means for developing the electrostatic latent images formed on said respective photosensitive bodies, respectively, by coloring materials of colors corresponding to said respective photosensitive bodies;

transfer means for superposing together and transferring the developed images of respective colors onto a transfer medium;

electrooptical elements disposed on light paths of the light beams emitted by said plurality of light scanning means, and deflecting, by amounts corresponding to applied voltages, the light beams transmitted therethrough;

voltage applying means for applying voltages to said electrooptical elements;

offset amount detecting means for detecting images-for-detecting-offset-amounts which are formed on the transfer medium by said plurality of light scanning means, said plurality of developing means, and said transfer means, so as to detect offset amounts of the images of the respective colors;

judging means for judging whether the detected offset amounts are less than, greater than or equal to a predetermined value; and control means for, in a case in which the detected offset amounts are judged by said judging means to be less than the predetermined value, controlling, on the basis of the detected offset amounts, said voltage applying means such that voltages for the offset amounts of the images of the respective colors to become values within a predetermined range are applied to said respective electrooptical elements, and in a case in which the detected offset amounts are judged by said judging means to be greater than or equal to the predetermined value, controlling, on the basis of the detected offset amounts, said voltage means and controlling timing of emission of the light beams of said plurality of light scanning means, such that the offset amounts of the images of the respective colors become values within a predetermined range.

13. A color image forming apparatus according to claim 12, wherein the transfer medium is a conveying body which conveys a medium on which an image is to be formed such that the medium on which the image is to be formed contacts said respective photosensitive bodies in order.

14. A color image forming apparatus according to claim 13, wherein the conveying body is an endless belt.

15. A color image forming apparatus according to claim 13, wherein images-for-detecting-offset-amounts are formed, by said plurality of light scanning means, said plurality of developing means, and said transfer means, on the transfer medium between plural media on which images are to be formed which are conveyed at predetermined intervals by the transfer medium.

16. A color image forming apparatus according to claim 12, wherein in a case in which the detected offset amounts are judged by said judging means to be less than the predetermined value, said control means controls the timing of the emission of the light beams of said plurality of light scanning means to correct per one pixel unit the offset amounts to become less than one pixel, and controls said voltage applying means to correct offset amounts of less than one pixel remaining due to said correction.

17. A color image forming apparatus according to claim 12, wherein said offset amount detecting means detects a plurality of images-for-detecting-offset-amounts which are formed by said plurality of light scanning means, said plurality of developing means, and said transfer means, at plural positions aligned along a direction corresponding to the predetermined direction on the transfer medium, and on the basis of the detected plurality of images-for-detecting-offset-amounts, said offset amount detecting means detects skews or amounts of bowing of respective scan lines of the predetermined direction of said respective photosensitive bodies, and detects offset amounts of the images of the respective colors.

18. A color image forming apparatus according to claim 17, wherein said offset amount detecting means detects positions of the images of the respective colors of the plurality of images-for-detecting-offset-amounts, and detects skews or amounts of bowing of respective scan lines on the transfer medium.

19. A color image forming apparatus according to claim 12, wherein said offset amount detecting means detects the offset amounts by using as a reference a predetermined position on the transfer medium or any one image of the images of the respective colors.

20. A color image forming apparatus according to claim 12, further comprising:

condition establishment judging means for judging whether a predetermined condition for said control is established, wherein in a case in which it is judged by said condition establishment judging means that a condition is established, said control means effects said control.

21. A color image forming apparatus according to claim 12, further comprising:

position detecting means for detecting positions of scan lines of said respective photosensitive bodies, wherein said control means computes displacement amounts of the detected positions each time the light beams are deflected, and on the basis of the computed displacement amounts, said control means again controls said voltage applying means to apply to said respective electrooptical elements voltages for the displacement amounts to become values of a predetermined range.

22. A color image forming apparatus according to claim 21, wherein said position detecting means detects light beams passing through predetermined positions before positions of initial incidence on image forming regions of said respective photosensitive bodies;

said plurality of light scanning means adjust timing of emission of the light beams, on the basis of detection of the light beams by said position detecting means; and said control means controls said voltage applying means such that voltages, of magnitudes detected in advance and for the light beams passing through said electrooptical elements to pass through the predetermined positions, are applied to said electrooptical elements at a timing at which the light beams pass through the predetermined positions.

23. A color image forming apparatus according to claim 21, wherein said position detecting means includes:

light-receiving means for light-receiving light beams changed by said light scanning means; and a gradation filter whose density in a direction intersecting the predetermined direction varies so as to cover a vicinity of a light-receiving surface of said light-receiving means and the light-receiving surface.

* * * * *